(12) United States Patent
Matuana

(10) Patent No.: US 7,897,681 B2
(45) Date of Patent: Mar. 1, 2011

(54) HYBRID PVC/WOOD-REINFORCEMENT NANOCOMPOSITES AND METHOD OF MANUFACTURE

(75) Inventor: Laurent M. Matuana, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 426 days.

(21) Appl. No.: 12/148,236

(22) Filed: Apr. 17, 2008

(65) Prior Publication Data

US 2008/0269377 A1    Oct. 30, 2008

Related U.S. Application Data

(60) Provisional application No. 60/926,371, filed on Apr. 26, 2007.

(51) Int. Cl.
| | |
|---|---|
| C08F 2/24 | (2006.01) |
| C08F 251/02 | (2006.01) |
| C08F 220/18 | (2006.01) |
| C08C 19/08 | (2006.01) |
| C08G 73/10 | (2006.01) |
| A61K 47/48 | (2006.01) |
| B03D 1/016 | (2006.01) |
| C08K 3/26 | (2006.01) |
| C08K 3/10 | (2006.01) |
| C08K 3/00 | (2006.01) |
| C08K 3/34 | (2006.01) |
| C04B 26/06 | (2006.01) |
| C01B 33/24 | (2006.01) |

(52) U.S. Cl. .......... 524/732; 524/733; 524/798; 524/834; 524/847; 524/12; 524/551; 524/425; 524/435; 524/401; 524/437; 524/447; 524/456; 524/436

(58) Field of Classification Search ............ 524/732, 524/733, 798, 834, 847, 12, 551, 425, 435, 524/401, 437, 447, 456, 436
See application file for complete search history.

(56) References Cited

U.S. PATENT DOCUMENTS

2006/0293418 A1    4/2006    Matuana (Continued)

FOREIGN PATENT DOCUMENTS

WO    WO 2006/030981    3/2006

OTHER PUBLICATIONS

B. L. Shah, L. M. Matuana, J. Vinyl Additive Tech.; 11 (4): 160-165 (2005).*

(Continued)

Primary Examiner—William K Cheung
(74) Attorney, Agent, or Firm—Ian C. McLeod; Steven M. Parks

(57) ABSTRACT

Compositions including composites of polyvinyl chloride (PVC) and nanoparticles are disclosed. A wood-polymer composite using the PVC-nanoparticle composite as a matrix also is disclosed. The nanoparticle filler is dispersed throughout the PVC matrix by blending the nanoparticles with a mixture of PVC particles that have been pre-heated to a temperature at or above a fusion point of the PVC, thereby fusing the PVC particles prior to the addition of the nanoparticles to the matrix. Also disclosed are methods of forming the composite compositions. The composite compositions can be used to replace wood boards.

18 Claims, 13 Drawing Sheets

U.S. PATENT DOCUMENTS

| | | |
|---|---|---|
| 2006/0142455 A1 | 6/2006 | Agarwal |
| 2006/0247332 A1 | 11/2006 | Coffey |
| 2007/0298253 A1 | 12/2007 | Hata |
| 2008/0194736 A1* | 8/2008 | Lu .................................. 524/35 |

OTHER PUBLICATIONS

J.M. Pilarski and L.M. Matuana, J. Vinyl Additive Technol., 11, 1 (2005).*
Matuana, L.M., Rigid PVC/(Layered Silicate) Nanocomposites Produced Through a Novel Melt-Blending Approach, Journal of Vinyl & Additive Technology, 15: 77-86, 2009.
L.M. Matuana and P.A. Heiden, "Wood Composites," in Encyclopedia of Polymer Science and Technology, Jacqueline I. Kroschwitz, Editor, John Wiley & Sons, Inc., (2004).
C. Clemons, For. Prod. J., 52, 10 (2002).
S.C. Jana and A. Prieto, J. Appl. Polym. Sci., 86, 2159 (2002).
S.C. Jana and A. Prieto, J. Appl. Polym. Sci., 86, 2168 (2002).
S.K. Yeh, A. Al-Mulla, and R.K. Gupta, SPE ANTEC Technical Papers, 1290 (2005).
S.K. Yeh, M.E. Casuccio, and A. Al-Mulla, SPE ANTEC Technical Papers, 209 (2006).
D. Wang and C.A Wilkie, J. Vinyl Additive & Technol., 8, 238 (2002).
T. Ren, J. Yang, Y. Huang, J. Ren, and Y. Liu, Polymer Compos., 27, 55 (2006).
D. Wang, D. Parlow, Q. Yao, and C.A Wilkie, J. Vinyl Additive & Technol., 8, 139 (2002).
C. Xiong, S. Lu, D. Wang, L. Dong, D.D. Jiang, Q. Wang, Nanotechnology, 16, 1787 (2005).
J.H. Du, J. Bai and H.M. Cheng, Express Polym. Lett., 1 (5), 253 (2007).
E.T. Thostenson, Z. Ren and T. Chou, Compos. Sci. Technol., 61, 1899 (2001).
E.B. Rabinovitch and J.W. Summers, J. Vinyl Additive & Technol., 2, 165 (1980).
E.B. Rabinovitch, J. Vinyl Additive & Technol., 4, 62 (1982).
Pegoretti A, Dorigato A, Penati A, Tensile mechanical response of polyethylene-clay nanocomposites, eXPRESS Poly. Lett. 2007; 1 (3): 123-131 (2007).
L.M. Matuana and J.W. Kim, J. Vinyl Additive & Technol., in press (Mar. 2007).
Anonymous, "Wood Handbook: Wood as an Engineering Material," Forest Products Laboratory General Technical Report (FPL-GTR-113), USDA Forest Service, (1999).
B. L. Shah, L. M. Matuana, J. Vinyl Additive Tech.; 11 (4): 160-165 (2005).
C. Wan, X. Qiao, Y. Zhang and Y. Zhang, Polym. Test., 22, 453 (2003).
L.A. Hinojosa-Falcon and L.A. Goettler, SPE ANTEC Tech. Papers, 6 pp. (2002).
O. Faruk and L.M. Matuana, J. Vinyl Additive Technol., 14, 60 (May 2008).
O. Faruk and L.M. Matuana, Compos. Sci. Technol. 68, 2073 (Jul. 2008).
M.L. Lopez-Quintanilla, S. Sanchez-Valdes, L.F. Ramos de Valle, F. J. Medellin-Rodriguez, J. Appl. Polym. Sci. 100, 4748 (2006).
M. Pan, X. Shi, X. Li, H. Hu and L. Zhang, J. Appl. Polym. Sci. 94, 277 (2004).
H. Hu, M. Pan, X. Li, X. Shi and L. Zhang, Polym. Int. 53, 225 (2004).
F. Samyn, S. Bourbigot, C. Jama, S. Bellayer, S. Nazare, R. Hull, A. Castrovinci, A. Fina and G. Camino, Eur. Polym. J., 44, 1642 (2008).
R.A. Vaia, K.D. Jandt, E.J. Kramer, and E.P. Giannelis, Chem. Mater., 8, 2628 (1996).
T.K. Chen, Y.I. Tien, and K.H. Wei, Polymer, 41, 1345 (2000).
Z.M. Liang, C.Y. Wan, Y. Zhang, P. Wei and J. Yin, J. Appl. Polym. Sci., 92, 567 (2004).
G. Beyer, Polym. Adv. Technol., 19, 485 (2008).
D. Benderly, F. Osorio, and W.L. IJdo, J. Vinyl Additive Technol., 14, 155 (Oct. 2008).
C.H. Chen, C.C. Teng, M.S. Tsai, F.S. Yen, J. Polym. Sci. Pt. B-Polym. Phys., 44, 2145 (2006).
International Preliminary Report on Patentability for PCT/US2008/004979, dated Oct. 27, 2009.
Xu, et al. "Glass polyvinyl chloride/montmorillonite nanocomposites," Journal of Thermochemical Analysis and Calorimetry, 2004, v78, p. 1-9.

* cited by examiner (Pristine nanoclay sample)

(Direct mixing of PVC and nanoclay)

(Addition of nanoclay to PVC at compaction)

(Addition of nanoclay to PVC at onset of fusion)

(Addition of nanoclay to PVC at equilibrium torque)

500 μm (Neat PVC)

(Direct mixing of PVC and nanoclay)

(Addition of nanoclay to PVC at onset of fusion)

HYBRID PVC/WOOD-REINFORCEMENT NANOCOMPOSITES AND METHOD OF MANUFACTURE

CROSS-REFERENCE TO RELATED APPLICATION

Priority is claimed to provisional application No. 60/926,371, filed Apr. 26, 2007, the entire disclosure of which is herein incorporated by reference.

STATEMENT REGARDING FEDERALLY SPONSORED RESEARCH OR DEVELOPMENT

This research was partially funded by a grant from the United States Department of Agriculture Cooperative State Research, Education, and Extension Service (USDA-CSREES), Grant No. 2006-34158-17581. The U.S. Government has certain rights in this invention.

BACKGROUND OF THE DISCLOSURE

1. Field of the Disclosure

The present disclosure relates to novel polyvinyl chloride (PVC) and nanoparticle compositions and a method for producing them. In particular, the present disclosure relates to introduction of the nanoparticles at or above the fusion temperature of the PVC. The compositions are particularly used with cellulosic reinforcement fillers (e.g., wood flour) and preferably a coupling agent such as chitin or chitosan, or other relevant coupling agents for PVC and wood composites (e.g., aminosilanes).

2. Brief Description of Related Technology

Wood-Plastic Composites (WPCs) products have emerged as a new class of materials that can be used as alternative to solid pressure-treated wood in a variety of innovative applications, such as decking, docks, landscaping timbers, fencing, playground equipment, window and door frames, etc. (1,2).

Generally, WPC products have strength and stiffness properties that are somewhere between both materials (1,2). They are stiffer than neat plastics. Nevertheless, composites based on commodity plastics (e.g. polyethylene (PE), polypropylene (PP), polystyrene (PS), and polyvinylchloride (PVC)) and wood-fibers do not offer mechanical performance similar to that of solid wood (1). For example, the flexural strength of WPCs made with commodity plastics are about two to three times lower than that of natural pine (softwood) or oak (hardwood), while the flexural modulus of WPC products is about one-half that of natural pine or oak (1). This lowered stiffness implies that, for the same load, a deck constructed with WPC products will bend more than a similar wood deck.

Improving upon the drawbacks of WPCs (e.g., lower flexural strength and modulus) could not only improve their acceptance in load-bearing structural applications, but also open new applications for these products, thus expanding their market share.

Several approaches with limited success have been proposed to substantially overcome the drawbacks of WPCs, including: (i) the use of higher wood fiber content (above 60 wt. %), (ii) the use of high performance plastics as a matrix, and (iii) modification of the matrix by incorporating nanoclay.

Increasing the amount of wood fiber reinforcements in WPCs can significantly enhance their stiffness due to the greater stiffness of the fibers. However, this approach also leads to a significant reduction in strength. In addition, the increased melt viscosity due to higher fiber loading makes processing more difficult (i.e., high pressure and torque, resulting in more energy being required), and the appearance of the final products suffers accordingly (e.g., poor surface quality, rough and tearing edges)(3).

The use of a high-performance polymer, such as poly(phenylene ether) (PPE), has also been proposed because of its greater strength and stiffness compared to commodity plastics (4,5). However, because of the high processing temperature of PPE (in the range of 280-320° C.), PPE can not be processed at lower temperatures (150-220° C.) needed to prevent the degradation of wood materials (2). A low molecular weight epoxy has been utilized to reduce the processing temperature of WPCs made with PPE (4). However, the epoxy acted as a plasticizer by softening the polymer, leading to lower strength and stiffness for the final products.

Recently, researchers have proposed to reinforce the matrix with nanoparticles and utilize these reinforced plastics (or nanoclay/plastics) as matrices for WPCs (6,7). Surprisingly, this approach has been unsuccessful. The results reported by Yeh et al. (6,7) has clearly demonstrated that both the flexural strength and modulus were considerably reduced as the amount of nanoclay (up to 20 wt. %) increases in WPCs made with 50% wood flour.

PVC has grown into one of the major thermoplastic materials, since it was first produced in the 1930's. There are a variety of PVC polymers available in the current commercial market. However, because of their inherent disadvantages, such as low thermal stability and brittleness, PVC products are subject to some limitations in certain applications. The common approach to overcome these drawbacks has been the utilization of a vast array of additives during the formulation of the resin.

During the past decade, nanocomposites based on nanoclay and polymers have been extensively studied as a newly developed polymer reinforcement technique (8). The use of nanoclay has been an attractive approach in the plastics industry to enhance the mechanical, thermal and barrier properties of the plastics even though the nanoclay amount is small (e.g., less than 10 wt. %). However, a homogeneous dispersion of nanoparticles (so-called exfoliation) in a polymeric matrix must be fully accomplished first to achieve the above-mentioned improvements.

The dispersion of nanoparticles into polymers is a challenge because of their strong tendency to agglomerate due to their high surface energy and large specific surface area. However, several approaches have been proposed to break down the agglomeration of nanoparticles during nanocomposite preparation. These approaches can be classified in two groups: (i) wet-based techniques, i.e., in-situ polymerization of a monomer with nanoparticles and solvent blending, and (ii) melt mixing of a polymer with nanoparticles. Each method has its advantages and limitations (9).

The synthesis of nanocomposites using wet-based techniques involves the dispersion of nanoparticles in water or organic solvents which must be properly disposed of to isolate the nanocomposites. Therefore, this approach is time consuming and not environmentally friendly.

In direct melt mixing approach (or dry mixing), however, the polymer, additives, and nanoclay are first dry-mixed and then melt-blended using conventional plastics processing equipment. Since this technique does not require solvent, it is more environmentally friendly. In addition, it is compatible with existing processing equipment, such as extruders, injection molders, mixing chambers (e.g., torque rheometers), etc., thus more effective in mass production of nanocomposites.

Since the extent of property improvement in nanocomposites is directly related to the degree of nanoclay dispersion, considerable efforts have been made to understand the formation of well-exfoliated nanocomposites via both melt processing and wet-based techniques. The properties of PVC-clay nanocomposites obtained via these two (2) methods have also been reported (8-11). Solution blending and in-situ polymerization method have been shown to be more efficient than melt mixing in improving mechanical properties at low clay content (e.g., 1-3 wt. %). However, at high nanoclay content, the effect of the preparation method in promoting the mechanical properties of nanocomposite is not significantly different from each other (8-10). Different trends have been reported by other authors where the mechanical and dynamic mechanical properties of an in situ $PVC/CaCO_3$-nanocomposites exhibited much higher strength, modulus, toughness, and glass transition temperature than the nanocomposites prepared by direct dry-blending (11).

Most studies on PVC nanocomposites have centered on plasticized formulations (8,10). Relatively little in depth examination has been performed on rigid forms in particular. In addition, little attention has been directed toward the effect of dry-blending compounding method on the performance of PVC nanocomposites.

Several investigators have studied the performance of various polymers reinforced with carbon nanotubes (CNT). CNT exhibit superior thermal, electrical, and optical properties compared to diamond (12). They also have an extremely high elastic modulus, which is greater than 1 TPa (the elastic modulus of diamond is 1.2 TPa) and strengths which are 10-100 times higher than the strongest steel at a fraction of the weight (13). Particularly, the mechanical properties of polymer/CNT composites as function of carbon nanotube types, contents, and processing parameters have extensively been evaluated. Most of the polymer/CNT composites showed only a moderate or no strength/modulus enhancement, especially for polymer/CNT composites using untreated CNTs as reinforcement. The lack of improvement was mainly attributed to poor CNT dispersion within the matrix (12).

It is an object of the present disclosure to provide a novel method for forming composite compositions of PVC with nanosized fillers (e.g., nanoparticles). It is further an object to provide a method that is easy to perform and economical. These and other objects will become increasingly apparent by reference to the following description and the drawings.

SUMMARY

The present disclosure provides nanoparticle-reinforced PVC-wood composites (PVC-nanoparticle WPCs). The PVC-nanoparticle WPC includes a PVC-nanoparticle composite as a matrix component. The PVC-nanoparticle composite includes a PVC polymer matrix and a nanoparticle filler dispersed throughout the matrix. A desirable, high degree of nanoparticle dispersion can be achieved by blending the nanoparticles and the PVC polymer at or after the fusion point of the PVC. The PVC-nanoparticle WPC is formed by adding a cellulosic reinforcement filler and an optional coupling agent to the PVC-nanoparticle composite. The PVC-nanoparticle composite has a high degree of nanoparticle dispersion that substantially increases the mechanical properties of the composite as compared to conventional direct mixing processes of composite formation. Additionally, the process is an environmentally friendly, solvent-free process. The improved properties of the PVC-nanoparticle composite also allow the formation of WPCs with properties similar to or better than those of various solid wood lumbers.

In one embodiment, a PVC-nanoparticle composite composition includes: a matrix including a PVC polymer; and a filler including nanoparticles that is dispersed throughout the matrix. The nanoparticles are added to the matrix by blending the nanoparticles with a mixture of PVC particles that have been pre-heated to a temperature at or above a fusion point of the PVC, thereby fusing the PVC particles prior to the addition of the nanoparticles to the matrix.

In another embodiment, a PVC-nanoparticle composite composition includes: a matrix including a PVC polymer; a filler including nanoparticles that is homogeneously dispersed throughout the matrix. The PVC-nanoparticle composite is substantially free of nanoparticle aggregates.

The disclosure also provides a method for forming a PVC-nanoparticle composite, which method includes: (a) heating particles of a polyvinyl chloride (PVC) polymer to a temperature at or above a fusion point of the PVC, thereby fusing the PVC particles; (b) blending a filler including nanoparticles into the fused PVC particles; and, (c) heating and mixing the blend of the fused PVC particles and the filler until the fused PVC particles are substantially eliminated, thereby forming the PVC-nanoparticle composite. The PVC-nanoparticle composite includes (i) a matrix including the PVC polymer and (ii) the nanoparticle filler dispersed throughout the matrix.

In any of the foregoing embodiments, the nanoparticles can be selected from nanoclays (preferred), carbon nanotubes (preferred), titanium dioxide, calcium carbonate, and combinations thereof, in particular at levels ranging from about 1 wt. % to about 10 wt. % relative to the PVC polymer. When the nanoparticles include a nanoclay, the nanoclay is preferably intercalated by at least a portion of the PVC polymer, is preferably present in an amount ranging from about 4 wt. % to about 10 wt. % relative to the PVC polymer, and is preferably selected from bentonite, montmorillonite (preferred), hectorite, fluorohectorite, saponite, beidellite, nontronite, and combinations thereof. The intercalated nanoclay preferably has a relative intercalation of at least about 15% (more preferably ranging from about 20% to about 60%) in the PVC-nanoparticle composite. Further, the PVC-nanoparticle composite is preferably solvent free. Additionally, the pre-heated PVC particles (preferably having a size of about 100 nm or less) can be compacted before blending with the nanoparticles. Further, the matrix can include one or more additives such as heat stabilizers and/or lubricating processing aids.

The PVC-nanoparticle composite of any of the foregoing embodiments can be formed into a PVC-nanoparticle WPC by blending the PVC-nanoparticle composite (which serves as a matrix for the WPC) with a cellulosic reinforcement and an optional coupling agent (both of which are dispersed in the WPC matrix, preferably homogeneously). The cellulosic reinforcement preferably includes a wood flour (e.g., cedar, pine, maple, oak, spruce, ash, etc., and combinations thereof). The coupling agent preferably includes chitin (more preferred) and/or chitosan. Other coupling agents such as aminosilanes, sodium hydroxide, and gallic acid also can be used. The PVC-nanoparticle WPC is preferably compression molded, injection molded, or extruded, and it can be formed into a precut lumber shape.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1A:
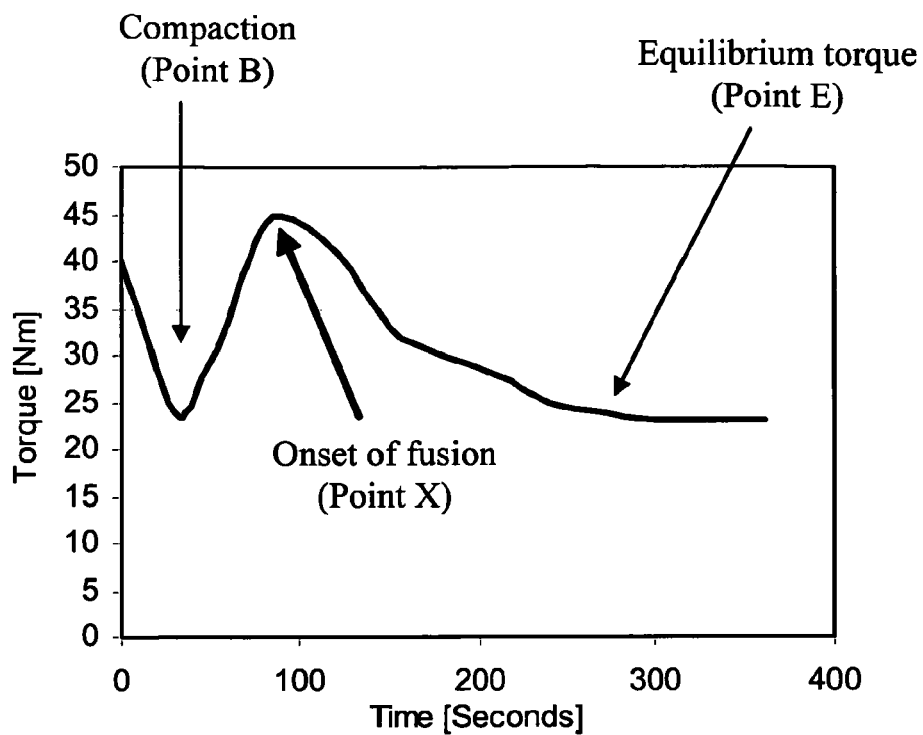
FIGS. 1a and 1b are graphs showing typical fusion curves for PVC.

While the disclosed compositions and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The present disclosure provides PVC-nanoparticle-cellulosic reinforcement (e.g., wood reinforcement) composites (or PVC-nanoparticle WPCs) with properties similar to or better than those of various solid wood lumbers. A base element of the resulting WPC is a PVC-nanoparticle composite composition that includes a PVC polymer matrix and a nanoparticle filler dispersed throughout the matrix (preferably homogeneously dispersed). Preferably, the PVC-nanoparticle composite is substantially free of nanoparticle aggregates. The desirable degree of nanoparticle dispersion can be achieved by blending the nanoparticles with a mixture of PVC particles that have been pre-heated to a temperature at or above a fusion point of the PVC, thereby fusing the PVC particles prior to the addition of the nanoparticles to the matrix. This approach of mixing and reinforcing PVC with nanoparticles based on the fusion peak of the PVC results in superior bending and tensile properties of the PVC-nanoparticle composite relative to those without nanoparticles. The WPC is formed by adding a cellulosic reinforcement filler (e.g., wood flour) and an optional coupling agent (e.g., chitin) to the PVC-nanoparticle composite, and the WPC can be compression molded or extruded into a precut lumber shape.

PVC-Nanoparticle Composite

PVC and Nanoparticle Components

The PVC polymer that is suitable in the disclosed composites is not particularly limited, and can include polymers produced, for example, by suspension (preferred), emulsion, mass, or solution polymerization. The PVC polymer preferably has a molecular weight that balances the processing and mechanical property characteristics of the polymer, for example as represented by a Fikentscher K-value ranging from about 60 to about 70 (although K-values ranging from about 40 to about 100 or about 50 to about 90 are also suitable). A suitable PVC polymer is commercially available from Shintech, Inc. (Houston, Tex.; K-value of 66).

The PVC polymer can be compounded with a variety of conventional additives to form the composite matrix. For example, heat stabilizers and lubricating processing aids can be blended with the PVC polymer prior to nanoparticle addition. Preferably, however, the PVC polymer is a rigid, unplasticized polymer (e.g., being free or substantially free of common PVC plasticizers, for example phthalates). The additives can be blended with the PVC polymer in any suitable amount that improves the processability of the polymer without substantially adversely affecting the mechanical properties of the resulting matrix (e.g., without adversely affecting their suitability for inclusion in a WPC as a lumber replacement). For example, when present, the total additive concentration can range from about 5 wt. % to about 40 wt. % (e.g., about 20 wt. %) relative to the neat PVC polymer.

The nanoparticles suitable as fillers for the PVC-nanoparticle composite are not particularly limited, and can generally include a variety of submicron-sized solids with favorable mechanical properties. Suitable nanoparticles are generally known in the art and can include, for example, nanoclays, carbon nanotubes (including both single-wall and/or multi-wall), graphite, titanium dioxide, calcium carbonate, ferromagnetic nanoparticles (e.g., cobalt-nickel alloys), and combinations thereof. The nanoparticles can have a variety of shapes/geometries, but generally have at least one characteristic dimension on the nanometer scale (e.g., less than about 100 nm, or ranging from about 1 nm to about 100 nm). For example, adjacent nanoclay layers generally have a thickness of about 1 nm. Similarly, carbon nanotubes generally have a diameter of about 10 nm to about 30 nm, although their length can be on the order of tens of microns. The nanoparticles are preferably included in an amount of about 1 wt. % to about 10 wt. %, for example about 4 wt. % to about 10 wt. % or about 5 wt. %, relative to the PVC polymer and any PVC additives (e.g., as described in Table 1 below).

Suitable nanoclays include layered or smectite clays that are natural or synthetic layered oxides such as bentonite, montmorillonite (preferred), hectorite, fluorohectorite, saponite, beidellite, nontronite, related analogs thereof, and combinations thereof. The layers are made up of a central octahedral sheet, usually occupied by aluminum or magnesium, sandwiched between two sheets of tetrahedral silicon sites. These negatively charged layers are approximately 1 nm thick, and are separated by hydrated cations such as alkali or alkali earth metal ions (e.g., $Na^+$ and/or $Ca^{2+}$ gallery cations). Preferably, the nanoclays are intercalated and/or exfoliated. In intercalated nanoclay, the insertion of the PVC polymer into the clay layer structure occurs in a crystallographically regular fashion. In exfoliated nanoclay, individual 1 nm-thick clay layers are separated in the PVC polymer matrix by average distances that depend on clay loading. Absent intercalation or exfoliation, clay tactoids exist in their original state of aggregated layers without penetration of the PVC polymer matrix between the layers of the clay. The nanoclays used for PVC-nanoparticle composite formation also can be ion-exchanged forms of smectite clays in which the alkali and/or alkali earth gallery cations of the pristine mineral have been replaced by organic onium ions. The onium ions may be protonated primary amines ($RNH_3^+$), secondary amines ($R_2NH_2^+$), or they may be tertiary amines ($R_3NH^+$) or quaternary ammonium ions ($R_4N^+$). The alkyl groups attached to nitrogen may be the same or different, and the alkyl groups may be replaced in part by a benzyl and/or phenyl groups. The alkyl groups may also be functionalized, as protonated α-, ω-amino acid. Phosphonium ions may be used in place of ammonium ions. Suitable commercial nanoclays are available from Southern Clay Products (Gonzales, Tex.) and include CLOISITE Na+ (a non-modified sodium montmorillonite) and CLOISITE 30B (a montmorillonite modified with a quaternary ammonium salt).

Compounding Method Based on PVC Fusion

Unlike polyolefins and other thermoplastics, PVC does not melt but it fuses. The present approach of adding and dispersing nanoparticles in the PVC polymer is based on following the fusion curve during melt mixing. The mechanisms of PVC fusion have been studied in detail by several researchers and a number of articles have been written (14,15). However, Rabinovitch and Summers were the first to describe in detail how the morphology of PVC changes during hot processing and provided clear mechanisms of PVC fusion (14,15). As described in their work, PVC fusion is considered as the thermal reduction of particle boundary surface. In other terms, the process of PVC fusion is essentially a destruction of the original coarse powder structure (100-200 μm in diameter) to submicroparticles (i.e., less than 1 μm in diameter, for example less than about 100 nm in diameter, or about approximately 10-30 nm in diameter) so that they can be compacted. During further interdiffusion of the PVC, the boundaries between the submicroparticles disappear and a three-dimensional network of polymer chains is formed.

This fusion process is illustrated in FIG. 1a. Using both microscopy and solvent techniques, Rabinovitch and Summers (14,15) have elucidated the relationship between PVC morphology and its processing. Their studies have shown that at compaction (point B in FIG. 1a), most PVC grains are torn apart and most of them are broken into primary particles (<100 μm in diameter) or their agglomerates. At the onset of fusion (point X), PVC particle size is reduced further (μm-nm in diameter). Finally, at equilibrium torque (point E), the particle structure completely disappears.

Accordingly, the disclosed method of forming the PVC-nanoparticle composite incorporates the nanoparticles into the PVC polymer matrix at the onset of PVC fusion, resulting in a much better dispersion of nanoparticles in the matrix because of the reduced size of the PVC particles. More specifically, the PVC-nanoparticle composite is formed by heating particles of the PVC polymer to a temperature at or above a fusion point of the PVC (i.e., thereby fusing the PVC particles) and subsequently blending a filler including nanoparticles into the fused PVC particles. The blend of fused PVC particles and nanoparticles is further heated and mixed until the fused PVC particles are substantially eliminated (i.e., due to further heating), thereby forming the PVC-nanoparticle composite (i.e., the composite including (i) the PVC polymer matrix and (ii) the nanoparticle filler dispersed throughout the matrix). The PVC-nanoparticle composite subsequently can be formed into any suitable shape, for example by compression molding or by extrusion. The resulting composite exhibits an increased level of nanoparticle dispersion that leads to a better overall performance of the composite product.

The improved dispersion preferably results in a PVC-nanoparticle composite that is substantially free of (or free from) nanoparticle aggregates. A sample of nanoparticles generally includes multiparticle aggregates in its native form. However, the disclosed fusion blending method disaggregates the native nanoparticles, for example resulting in a PVC-nanoparticle composite that is substantially free from nanoparticle aggregates having an aggregate size that adversely affects the mechanical properties of the composite (e.g., substantially free from nanoparticle aggregates having a aggregate size above about 10 μm, more preferably above about 5 μm or above about 2 μm). In contrast, a direct mixing process generally results in a composite having a substantial number of larger nanoparticle aggregates, which aggregates can reduce the flexural and tensile properties of the composite relative to the PVC polymer matrix alone. In contrast, the addition of nanoparticles to the PVC polymer at or after the onset of PVC particle fusion substantially eliminates aggregates and forms a composite having flexural and tensile properties superior to those of the PVC polymer matrix alone. These features and effects are illustrated and discussed in more detail below in Tables 5, 6, 14, and 15 and FIGS. 4a-4c.

The improved dispersion also improves the degree of intercalation of adjacent nanoclay layers. Preferably, the nanoclay is intercalated by at least a portion of the PVC polymer (i.e., some polymer intercalates adjacent polymer layers while the remaining polymer forms the bulk composite matrix). Additionally, the average relative intercalation (RI; expressed as a percent) of the nanoclay in the PVC-nanoparticle composite is preferably at least about 15%, more preferably at least about 20%. The relative intercalation can be locally higher than these values, in particular in regions where the nanoclay is completely exfoliated. In intercalated regions of the nanoclay, however, the relative intercalation preferably ranges from about 15% to about 100%, more preferably from about 20% to about 60%. The relative intercalation can suitably be measured by transmission electron scanning microscopy (TEM). The values of d-spacings obtained from the TEM images are used to calculate the relative intercalation of the PVC polymer into the nanoclay according to the following equation (16):

$$RI = \frac{(d - d_o)}{d_o} \cdot 100, \qquad (I)$$

where d is the interlayer or d-spacing of the clay in the PVC-nanoparticle composite, and do is the d-spacing of the clay in the pristine nanoclay. The improvement in the degree of intercalation also can be applied more generally to the spacing between adjacent structures in other type of nanoparticles (e.g., individual carbon nanotubes, graphite layers).

The compounding method also allows the PVC-nanoparticle composite to be formed without the use of solvents (i.e., without the use of a wet blending technique). As a result, the present approach (1) eliminates the need to separate the PVC-nanoparticle composite from an organic solvent in a processing step, (2) avoids potential emission and/or management of waste organic solvent, and (3) forms a final composite that is free (or substantially free) from solvent (i.e., which solvent might otherwise leach from a final product and/or adversely impact the mechanical/physical properties of the final product).

PVC-Nanoparticle-Cellulosic Reinforcement Composite

The disclosed PVC-nanoparticle composites are preferably used a matrix for the addition of a cellulosic reinforcement to form a PVC-nanoparticle WPC. The PVC-nanoparticle WPC preferably also includes a coupling agent to improve the adhesion between the PVC polymer matrix and the cellulosic reinforcement.

The cellulosic reinforcement may be from any suitable source, for example a wood material or other lignocellulosic material. Suitable examples of the wood reinforcement include fiber, chip, flake, flour (e.g., sawdust or powder from a hardwood or a softwood, for example cedar, pine, maple, oak, ash, and/or spruce), etc. The wood reinforcement is preferably a dried wood flour (e.g., having particle sizes between about 1 µm to about 1,000 µm, more preferably less than about 500 µm or a 40-mesh-pass size), for example being dried in an oven for 48 hrs at 105° C. to a moisture content of less than 1% before compounding and processing. Moisture can also be removed by venting during processing. The wood reinforcement can be derived from virgin wood fibers or waste wood byproducts (e.g., urban and demolition wood waste, wood trim pieces, wood milling by-products, pellets, paper pulp, sawdust, scrap paper/newspaper). Wood waste originated from plywood, particle board, medium density fiberboard, and CCA-treated timber (i.e., chromated copper arsenate) may also be used, provided the emission of the toxic compounds during processing and under service conditions of the resultant wood/plastic composites is negligible. Other suitable cellulosic reinforcements include natural fibers from lignocellulosic materials such as flax, bagass, jute, hemp, sisal, cotton, ramie, coir, straw and the like. The cellulosic reinforcements may vary greatly in size, shape, particles size distribution, and aspect ratio (e.g., chips, flours, flakes, fibers) . A suitable cellulosic reinforcement includes a hardwood maple wood flour (available from American Wood Fibers (Schofield, Wis.)).

The cellulosic reinforcement may be included in the PVC-nanoparticle WPC in any suitable amount to improve the mechanical properties of the resulting composite, for example up to about 70 wt. % based on the total weight of the composite (i.e., including the PVC polymer, any PVC additives, nanoparticle fillers, cellulosic reinforcements, coupling agents, etc.). Preferably, the cellulosic reinforcement is present in an amount ranging from about 30 wt. % to about 70 wt. %, more preferably about 35 wt. % to about 50 wt. %, or about 40 wt. % based on the total weight of the composite.

Effective interfacial adhesion between the cellulosic reinforcement and the PVC polymer matrix improves the processing and ultimate performance of the final PVC-nanoparticle WPC. The coupling agent is preferably added to the WPCs to promote adhesion between the hydrophilic wood surface and hydrophobic polymer matrix.

While a variety of coupling agents can generally be used (e.g., aminosilanes), preferred coupling agents include chitin and/or chitosan, two natural polymers. Depending on the formulation, the addition of chitin and/or chitosan coupling agents to PVC-nanoparticle WPCs can substantially increase the flexural strength and the flexural modulus as compared to the composites without the coupling agents. Chitin is a particularly preferred coupling agent. Other coupling agents such as aminosilanes, sodium hydroxide, and gallic acid also can be used. Preferably, the coupling agent is added to the WPC in an amount up to about 10 wt. % based on the weight of the cellulosic reinforcement. For example, chitin is preferably present in an amount ranging from about 2 wt. % to about 10 wt. %, more preferably about 6 wt. % to about 8 wt. % (or about 6.7 wt. %). In contrast, chitosan is preferably present in an amount ranging from about 0.1 wt. % to about 3 wt. %, more preferably about 0.2 wt. % to about 1 wt. % (or about 0.5 wt. %). Suitable commercial sources both chitin and chitosan include TCI America (Portland, Oreg.) and Tokyo Kasei Kagyo Co. Ltd. (Japan).

The PVC-nanoparticle WPC can be formed by dry-blending the PVC-nanoparticle composite (e.g., which has been ground or otherwise formed into a particulate material) with the cellulosic reinforcement and any optional coupling agent.

The blend is heated until a melted blend is formed. The melted blend can be formed into the final WPC by any suitable means, for example by compression molding, injection molding, or extrusion. Preferably, the WPC is formed into a precut lumber shape.

EXAMPLES

The following Examples evaluate the influence of the compounding route of the PVC polymer and the nanoparticles on the flexural, tensile, dispersion, and morphology properties of the resulting composites. The fusion curves were followed during blend mixing to develop novel strategies of introducing nanoparticles into the PVC polymer matrix.

The Examples show two (2) different aspects of developing hybrid PVC-nanoparticle WPCs with properties similar to or better than those of various solid wood lumbers. First, a novel approach of achieving a better dispersion of nanoparticles in rigid PVC by using a melt blending approach based on the fusion characteristics of PVC is developed. Second, the nanoparticle-reinforced PVC is used as a matrix in the manufacture of PVC-nanoparticle WPCs.

Materials

The PVC (K value 66.4) used in the following examples was donated by Shintech Inc. (Houston, Tex.). Prior to the addition of any nanoparticulates and/or wood flour fillers, the PVC was compounded with various additives listed in Table 1 (including supplier information and additive amount, relative to 100 weight-parts of the PVC (i.e., "phr")). The PARALOID products are lubricating processing aids. Calcium stearate and paraffin wax are used for lubrication. The tin stabilizer is used to prevent deterioration of the PVC during heating. As used in the following examples, the term "PVC" or "rigid PVC" refers to the PVC formulation listed in Table 1 (i.e., pure PVC and the indicated additives).

TABLE 1

| PVC Formulation Used for PVC-Nanocomposites and WPCs | |
|---|---|
| Ingredient | Content (phr) |
| PVC K-66 (Shintech) | 100 |
| PLASTISTAB 2808 tin stabilizer (Halstab) | 2 |
| SYNPRO Calcium stearate (Ferro Corp.) | 1.5 |
| Paraffin wax (Gulf Wax) | 2 |
| PARALOID K-120 (Rohm and Haas Co.) | 2 |
| PARALOID K-175 (Rohm and Haas Co.) | 2 |
| PARALOID KM-334 (Rohm and Haas Co.) | 10 |

Several types of nanoparticles were used in the following examples. Two different types of natural montmorillonite nanoclay purchased from Southern Clay Products (Gonzales, Tex.) were used as nanoparticles. CLOISITE Na$^+$ is a non-modified sodium montmorillonite whereas CLOISITE 30B is a montmorillonite modified with a quaternary ammonium salt. The supplier-provided characteristics of the nanoclays are summarized in Table 2. Industrial grade, 90 wt. % multi-walled carbon nanotubes (CNT) (diameter: 10-30 nm, length: 10-30 µm) purchased from Cheap Tubes Inc. (Brattleboro, Vt.) were also used.

TABLE 2

Characteristics of Different Layered Silicate (Nanoclay) Products.

| Nanoclay | Modifier | XRD $d_{001}$ | Particle size (% under) | | | Density |
|---|---|---|---|---|---|---|
| | | | 10%≦ | 50%≦ | 90%≦ | |
| CLOSITE Na+ | None | 11.7 Å | 2 μm | 6 μm | 13 μm | 2.86 g/cm$^3$ |
| CLOSITE 30B | Methyl, tallow, bis-2-hydroxyethyl, quaternary ammonium (90 meq/100 g clay)) | 18.5 Å | 2 μm | 6 μm | 13 μm | 1.98 g/cm$^3$ |

Wood flour from hardwood maple species (40-mesh size) supplied by American Wood Fibers (Schofield, Wis.) was used as a filler. Chitin, obtained from Tokyo Kasei Kagyo Co. Ltd. (Japan), was used as a coupling agent to improve the adhesion between PVC and wood flour.

Property Evaluation

The degree of nanoclay intercalation in PVC-nanoparticle composites were characterized by an X-ray diffraction (XRD) method and bright field transmission electron microscopy (TEM) images obtained at 60 kV with a JEOL 100CX TEM. Changes in particle size of neat PVC before and during fusion were observed with scanning electron microscope (SEM) images obtained from JEOL 6300F FESEM using 15 kV accelerating voltage. The samples were gold coated for conductance.

Dynamic mechanical analysis (DMA) was carried out on a Perkin Elmer (DMA 7e) instrument in the three-point bending mode and storage modulus, loss modulus, and tan δ of the samples were determined. The test was performed in the temperature sweep mode from 20° C. to 150° C. under a helium atmosphere at a frequency of 1 Hz and at a heating rate of 5° C./min. Two (2) samples were tested for each formulation.

The tensile and flexural tests (Instron 4206 with IX software) were conducted at test speeds of 5 mm/min and 2 mm/min according to ASTM D638 and ASTM D790, respectively for nanoclay-based composites. Similarly, for carbon nanotube-based composites, the tensile and flexural tests (Instron 5585H with Bluehill 2 software) were conducted at test speeds of 5 mm/min and 1.3 mm/min according to ASTM D638 and ASTM D790. By contrast, the tensile and flexural test speeds were set at 2 mm/min for all wood-plastic composite samples. All tests were performed at room temperature under a relative humidity of 50%. At least seven (7) samples were tested for each formulation.

The electrical conductivity of the CNT-reinforced composite samples was measured using a Gamry electrochemical impedance spectrometer. The dimensions of the samples were about 30×12×3 mm$^3$. The samples were plasma treated and their ends were coated with a silver paste to ensure good electrical contact. Three samples were tested for each formulation. The electrical conductivity, which is the reciprocal of electrical resistivity, was determined by resistivity measurements of the composites. The electrical resistivity of a material is calculated as follows: $\rho = R \times A/l$, where $\rho$ is the static resistivity, R is the electrical resistance of a uniform specimen, l is the length of the specimen, and A is the cross-sectional area of the specimen.

The thermal conductivity of carbon nanotube-based composites was measured with a guarded heat flow meter method (UNITHERM model 2022) according to ASTM standard E1530. Each sample was disc-shaped (1 inch diameter) and tested at room temperature (25° C.). Three samples were tested for each formulation.

Statistical Analysis

A one-way analysis of variance (ANOVA) was carried out with an a significance value of 0.05, to investigate the statistical significance of varying a particular parameter of the composite compositions (e.g., point of addition of nanoparticles to the PVC polymer particles) on the resulting properties of the composites. All statistical analyses were performed using Design Expert software (v.7) from Stat-Ease (Minneapolis, Minn.). The superscript letters in Tables 5-8 and 12 represent the statistical analysis results. The same letter denotes that the difference between these two treatments is not statistically significant. Otherwise, the difference is statistically significant (i.e., $p<0.05$). For example, in Table 8, the strength of the PVC-CNT composite at 3 wt. % CNT has a statistically significant difference relative to the strength at 5 wt. % CNT (i.e., because neither "B" nor "C" matches "D"); however, the strength of the PVC-CNT composite at 3 wt. % CNT does not have a statistically significant difference relative to the strength at 7.5 wt. % CNT (i.e., because either "B" or "C" matches "C").

Example 1

PVC/Nanoparticle Composites

Mixing of Nanoparticles with Rigid PVC

PVC and other additives listed in Table 1 were dry-blended in a high intensity mixer for 10 minutes at 20-23° C.

Nanoparticles (e.g., nanoclay, carbon nanotubes) were then mixed with the above described pre-blended PVC formulation in a 60-ml, electrically heated, three-piece internal mixer/measuring head (3:2 gear ratio) with roller-style mixing blades.

The strategy used to disperse the nanoparticles into the pre-blended PVC was as follows: The pre-blended PVC was placed into the mixer and the mixing process was started to follow the fusion curve. Four (4) different compounding addition methods were examined during melt compounding of PVC with nanoparticles:
  a) Direct addition of nanoparticles into the PVC before melt blending (i.e., direct mixing of PVC and nanoparticles);
  b) Addition of nanoparticles at compaction (point B);
  c) Addition of nanoparticles at the onset of fusion (point X); and
  d) Addition of nanoparticles at equilibrium torque (point E).

Figure 1B:
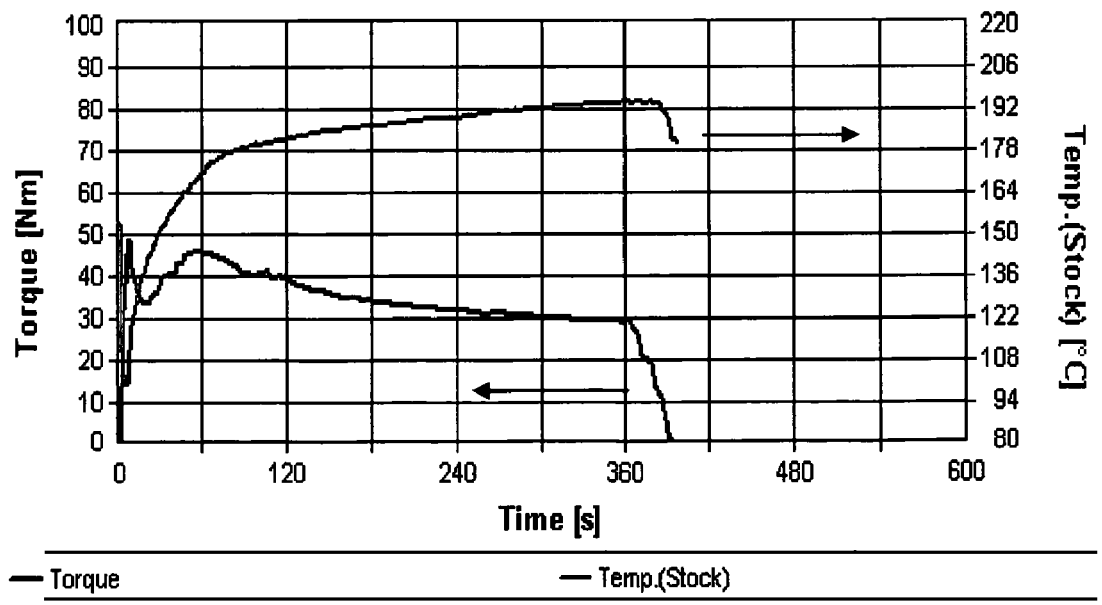
Figure 2A:
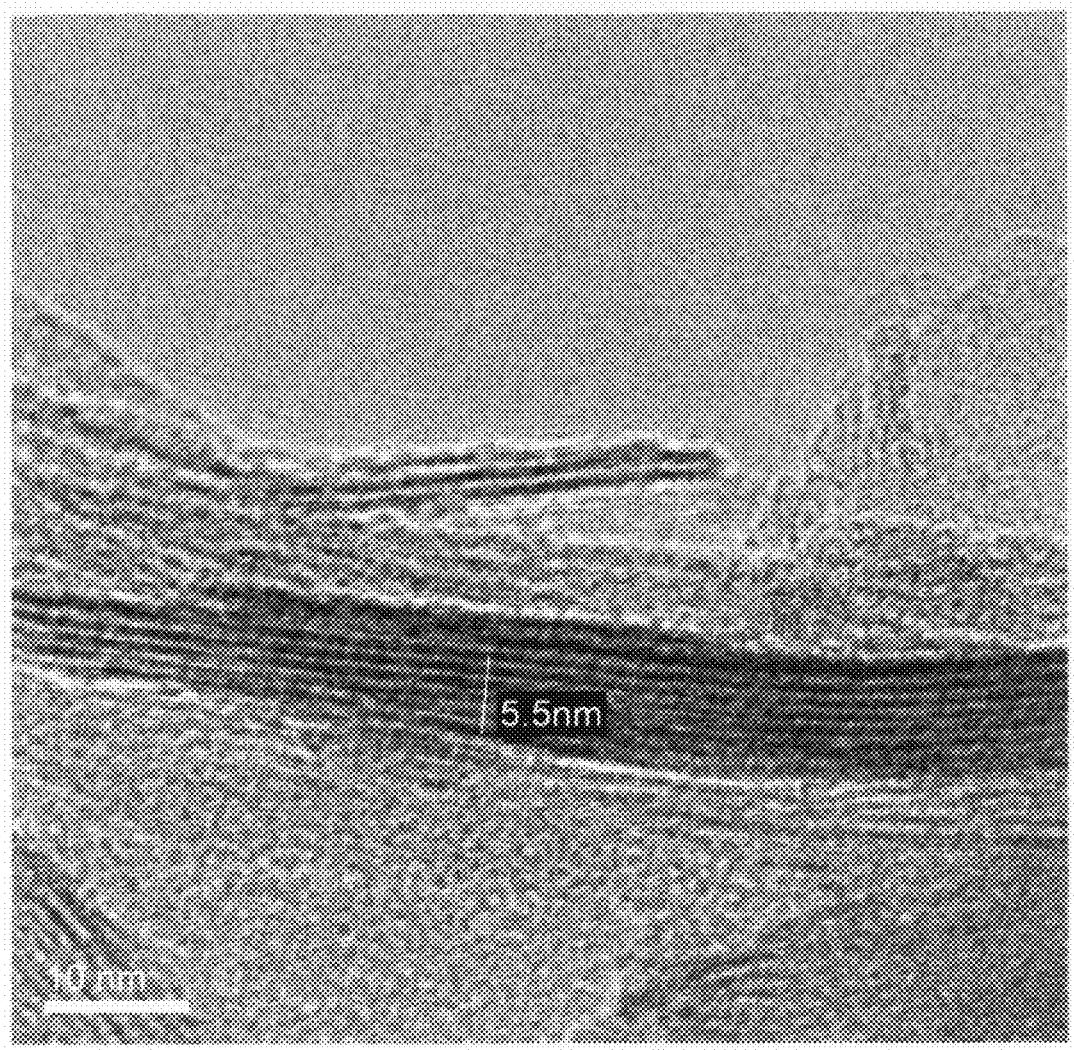
FIGS. 2a to 2e are TEM images illustrating the relative intercalation of a nanoclay by PVC, based on the addition sequence of the nanoclay to the PVC.
Figure 2B:
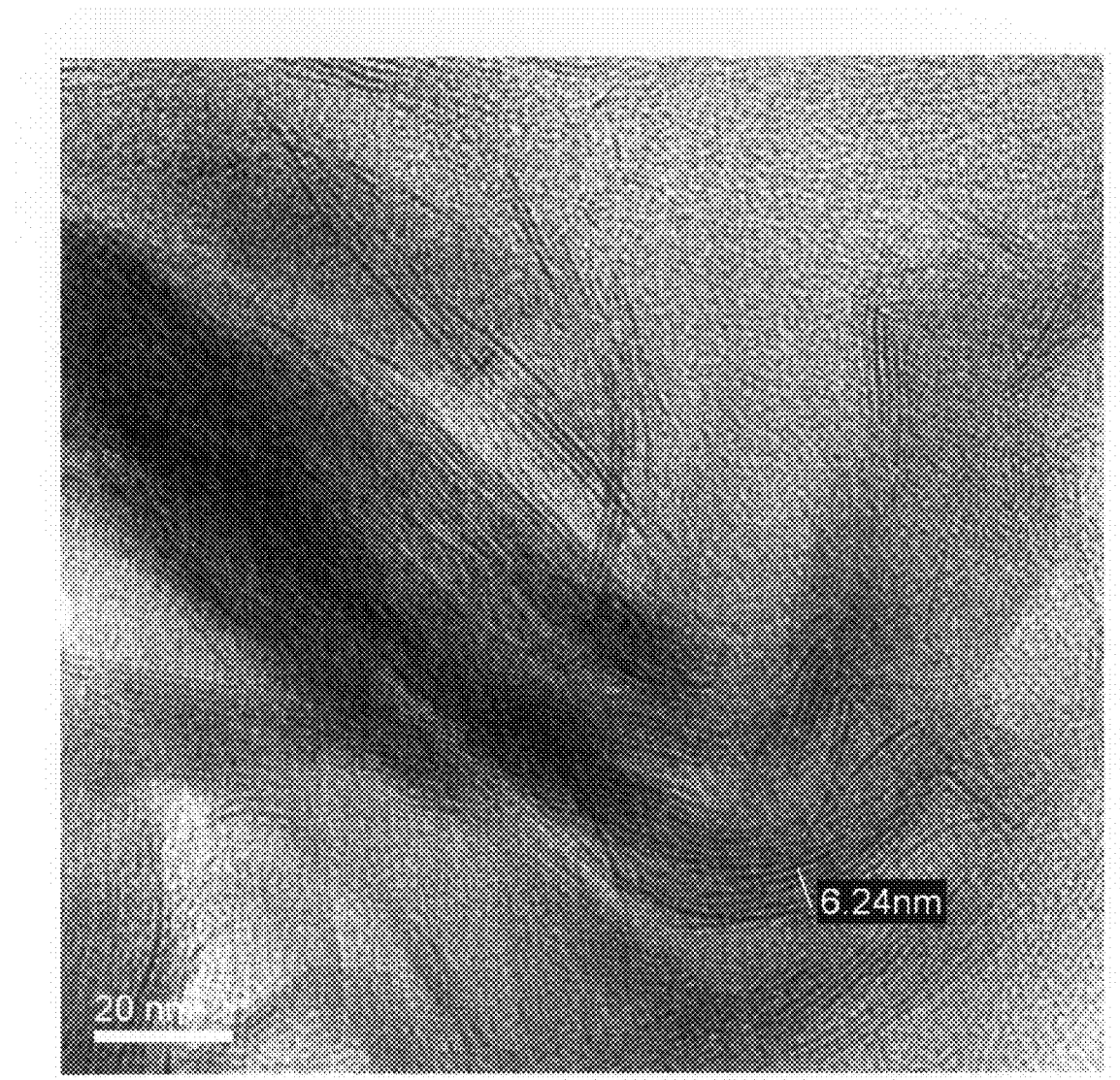
Figure 2C:
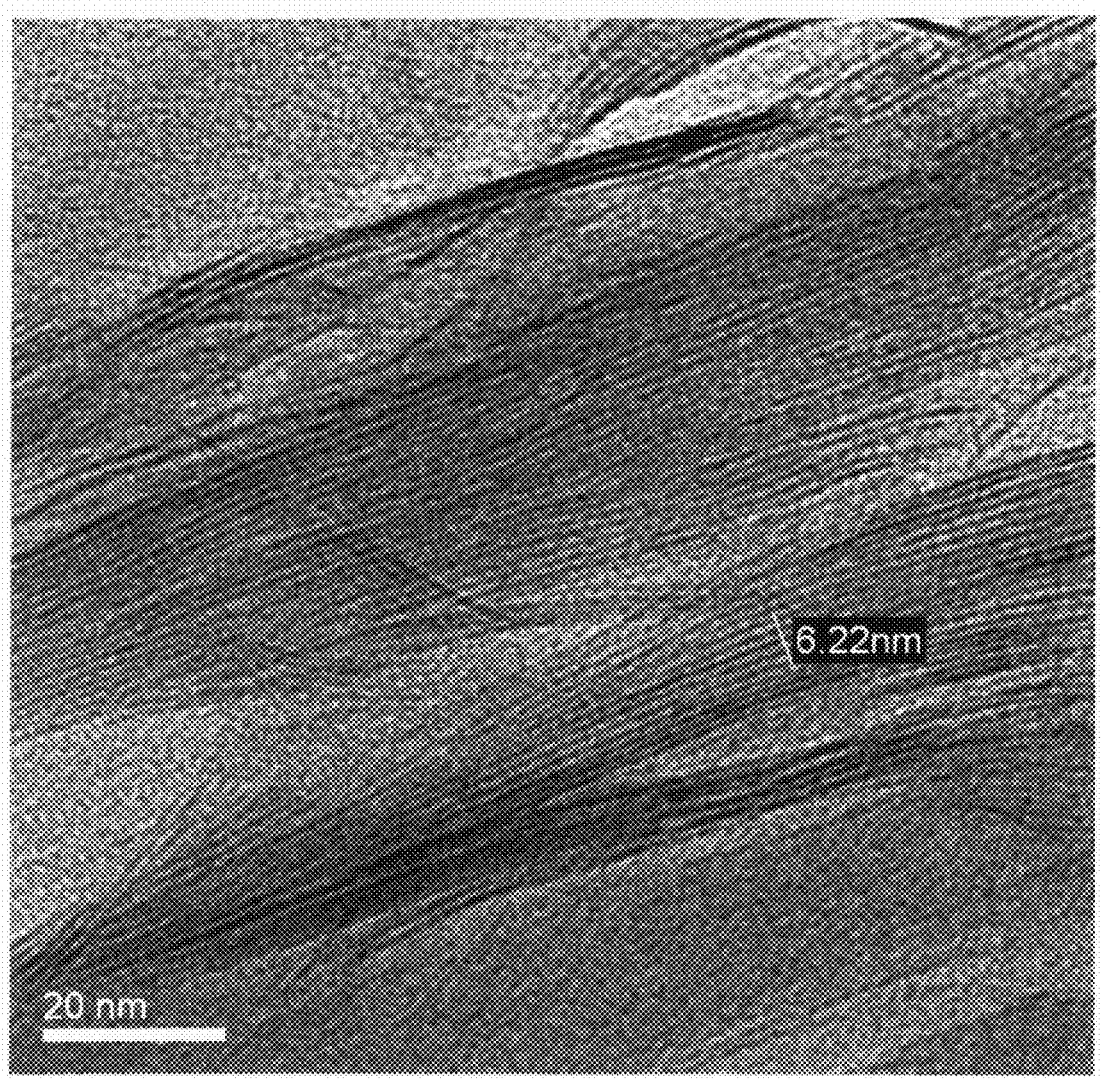
Figure 2D:
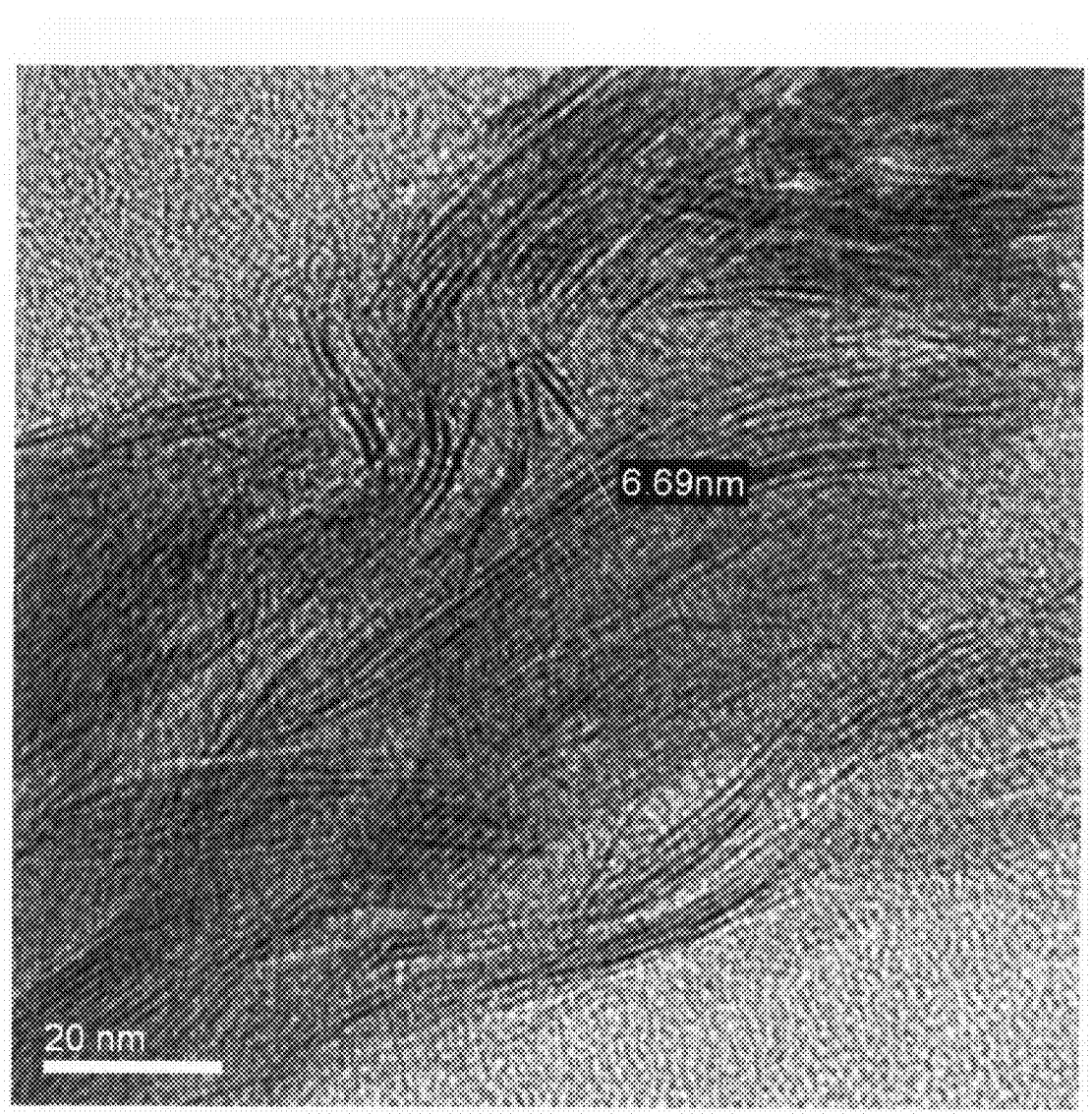
Figure 2E:
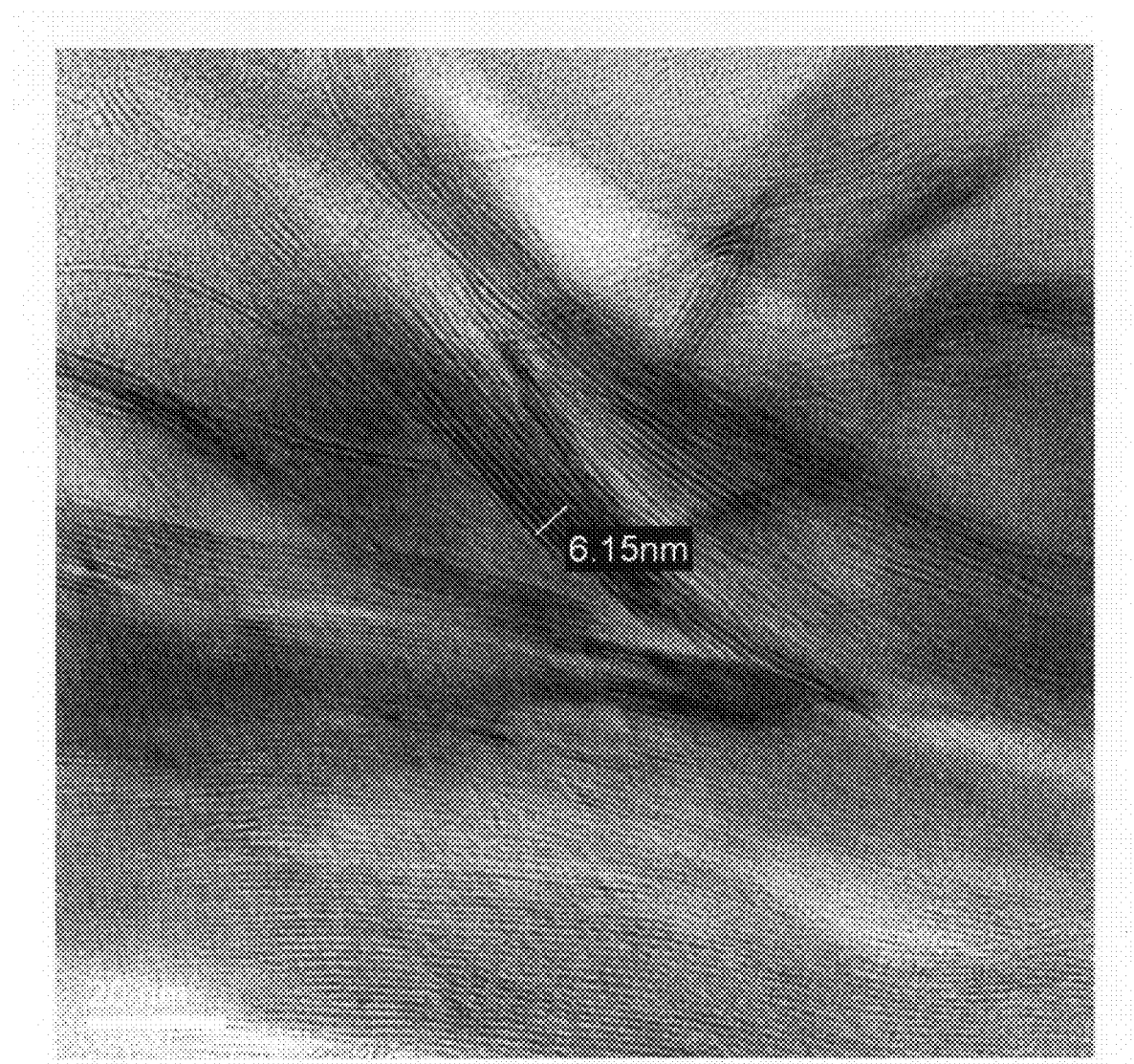

After nanoparticle addition, the materials remained in the mixer five more minutes after reaching the equilibrium torque. An example time-temperature-torque relationship for the blending addition process is illustrated in FIG. 1b. As can be see from FIG. 1b, the shear-heating effect in the mixer causes the blend temperature to increase beyond the mixer's 150° C. set-point (see below).

The mixing process was run at a constant mixer temperature of 150° C. for 10 minutes. The rotor speed used was 50 rpm and the weight charge were set at 65 g. Unless otherwise mentioned, the nanoparticle content in the composites was selected to be about 5 wt. %, based on the total amount of materials in the mixer. A 5 kg dead weight was put on the top of a ram throughout the experiments (17). The ram is like a piston that pushes the sample inside the mixer. The mixer is available from C. W. Brabender Instruments, Inc. (South Hackensack, N.J.).

For comparison, neat rigid PVC (i.e., without nanoparticles but with PVC additives) was prepared and was run in the mixer as a control matrix. This was accomplished to eliminate the thermal history effect between PVC/nanoparticle composites and neat rigid PVC (control).

Preparation of PVC/Nanoparticle Composites Via Compression Molding

The melted composites were then compression molded into panels (Carver Laboratory Press, Fred S. Carver Inc. USA) at 180° C. for 2 minutes. The panel's thickness was around 3 mm.

Structure of Intercalated Nanoclay in PVC/Layered Silicate Nanocomposites

The effect of the nanoclay's addition sequence to the PVC polymer on the interlayer or d-spacings of the clay in the nanocomposites was evaluated, and the results are listed in Table 3. A transmission electron scanning microscope (TEM) was employed to estimate the degree of intercalation of the PVC polymer into nanoclay in the final composite. Using the TEM technique, the effect of the nanoclay's addition sequence on d-spacings of the clay in the composites was evaluated. FIGS. 2a-2e illustrate the results for the unmodified nanoclay (CLOISITE Na$^+$). Similar TEM images were recorded for the modified nanoclay (CLOISITE 30B; not shown). The values of d-spacings obtained from the TEM images were utilized to calculate the relative intercalation (RI) of the PVC polymer into the nanoclay according to Equation I above. For example, in FIG. 2d (i.e., corresponding to the addition of the nanoclay to the PVC at onset of fusion), the total thickness of six adjacent clay layers was measured to be 6.69 nm, so the average d-spacing of the five corresponding gaps between adjacent layers was 1.34 nm (i.e., 6.69 nm÷5=1.34 nm or 13.4 Å).

TABLE 3

Interlayer Spacing and Relative Intercalation in PVC/Nanoclay Composites

| Point of Addition of Nanoclay into PVC Matrix | CLOISITE Na$^+$ | | CLOISITE 30B | |
|---|---|---|---|---|
| | $d_{001}$ (Å) | RI (%) | $d_{001}$ (Å) | RI (%) |
| Pure nanoclay powder | 11.0 | — | 12.0 | — |
| Direct mixing | 12.5 | 13.6 | 12.8 | 6.7 |
| At compaction (Point B) | 12.4 | 12.7 | 13.1 | 9.2 |
| Onset of fusion (Point X) | 13.4 | 21.8 | 18.3 | 52.5 |
| Equilibrium torque (Point E) | 12.3 | 11.8 | 12.2 | 1.7 |

Figure 3A:
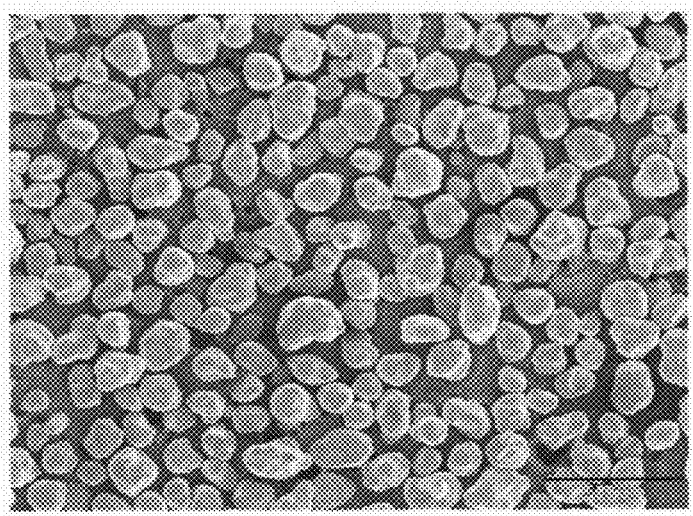
FIGS. 3a to 3c are SEM images of PVC particles at different stages of the PVC fusion process: (a) initial PVC particles without additives before any heating for nanoparticle addition, (b) PVC particles collected at the compaction (Point B), and (c) PVC particles collected at the onset of fusion (Point X).
Figure 3B:
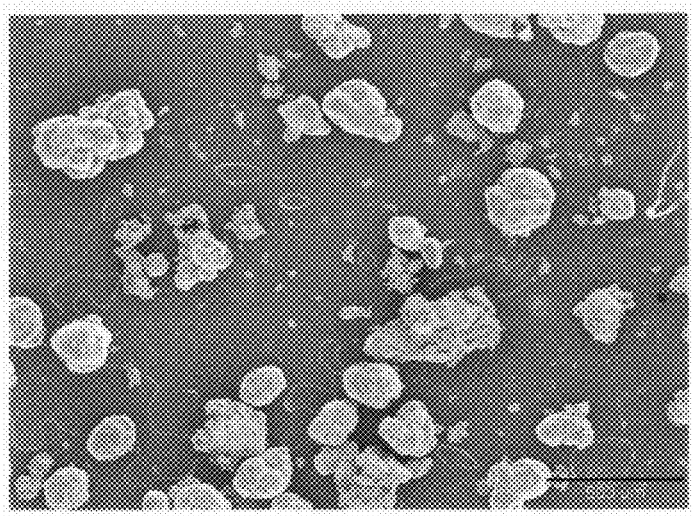
Figure 3C:
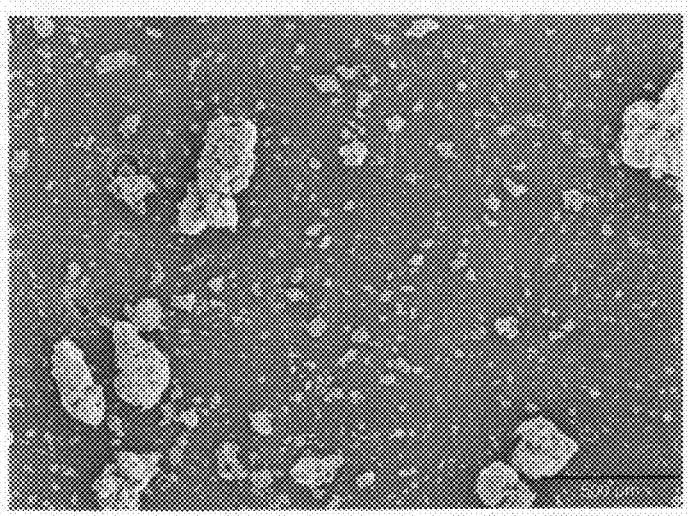

The nanoclay addition sequence during compounding had a significant effect on both the interlayer spacing in nanoclays and degree of intercalation of polymer in nanoclays. Generally, the addition of nanoclays at the onset of fusion (Point X) induced a slightly greater increase in the interlayer spacing and intercalated more with PVC than at other addition sequences, irrespective of the nanoclay modification. This increased trend in degree of intercalation may be attributed to the significant reduction in PVC particle size that occurred at the onset of fusion during compounding, as illustrated in the SEM images of FIGS. 3a-3c. FIG. 3a illustrates initial PVC particles without additives before any heating for nanoparticle addition, FIG. 3b illustrates PVC particles collected at the compaction (Point B), and FIG. 3c illustrates PVC particles collected at the onset of fusion (Point X). Nevertheless, it should be mentioned that the degree of intercalation was a strong function of nanoclay modification since nanocomposites based on modified clay (CLOISITE 30B) showed a slightly greater relative intercalation than the counterparts with unmodified nanoclays (CLOISITE Na+). This observed difference may be due to the nature of the organic modifier of the nanoparticle (Table 2). The presence of more reactive methyl, tallow, bis-2-hydroxyethyl, quaternary ammonium in CLOISITE 30B may have favored the chemical interaction between the polymer and nanoclay, making the polymer more compatible with the nanoclay layers. As a result, the penetration of PVC chains between the nanoclay layers was better in modified CLOISITE 30B-based nanocomposites than in the composites with unmodified nanoclay.

Mechanical Properties of Nanoclay-Reinforced Rigid PVC

Dynamic mechanical properties (storage modulus, loss modulus and tan δ) are usually used to assess the exfoliation or the degree of dispersion of nanoclay in the matrix. Generally, a better dispersion results in improved dynamic mechanical properties of the matrix.

Table 4 summarizes the dynamic mechanical properties of PVC filled with 5 wt. % nanoclay (CLOISITE Na$^+$; compression molded). The nanoparticles were added in PVC at different times during fusion. As can be seen, both the elastic (storage modulus) and viscous (loss modulus) properties improved substantially when the nanoclay was introduced at the onset of fusion. As expected, at this point, the PVC particles are reduced in size, leading to a much better dispersion. The increased dynamic properties can be attributed to the reduced mobility of PVC chains due to the polymer chains being intercalated between nanoclay interlayers which can restrict the free motion of PVC chain (9).

TABLE 4

Dynamic Mechanical Properties of PVC/Nanoclay Composites (CLOISITE Na$^+$)

| Point of Addition of Nanoclay into PVC Matrix | Storage Modulus E' (GPa) | | | Loss Modulus E'' (GPa) | | | Tan δ |
|---|---|---|---|---|---|---|---|
| | 40° C. | 50° C. | 60° C. | 40° C. | 50° C. | 60° C. | |
| No nanoclay added (control) | 5.8 | 5.1 | 4.5 | 0.64 | 0.72 | 0.80 | 88.8 |
| Direct mixing | 5.2 | 4.6 | 4.0 | 0.52 | 0.55 | 0.60 | 87.8 |

TABLE 4-continued

Dynamic Mechanical Properties of
PVC/Nanoclay Composites (CLOISITE Na+)

| Point of Addition of Nanoclay into PVC Matrix | Storage Modulus E' (GPa) | | | Loss Modulus E" (GPa) | | | Tan δ |
|---|---|---|---|---|---|---|---|
| | 40° C. | 50° C. | 60° C. | 40° C. | 50° C. | 60° C. | |
| At compaction (Point B) | 6.2 | 5.3 | 4.6 | 0.76 | 0.89 | 1.10 | 88.2 |
| Onset of fusion (Point X) | 10.7 | 9.4 | 8.6 | 1.70 | 1.60 | 1.50 | 88.6 |
| Equilibrium torque (Point E) | 5.8 | 5.0 | 4.3 | 0.67 | 0.69 | 0.77 | 88.4 |

Figure 4A:
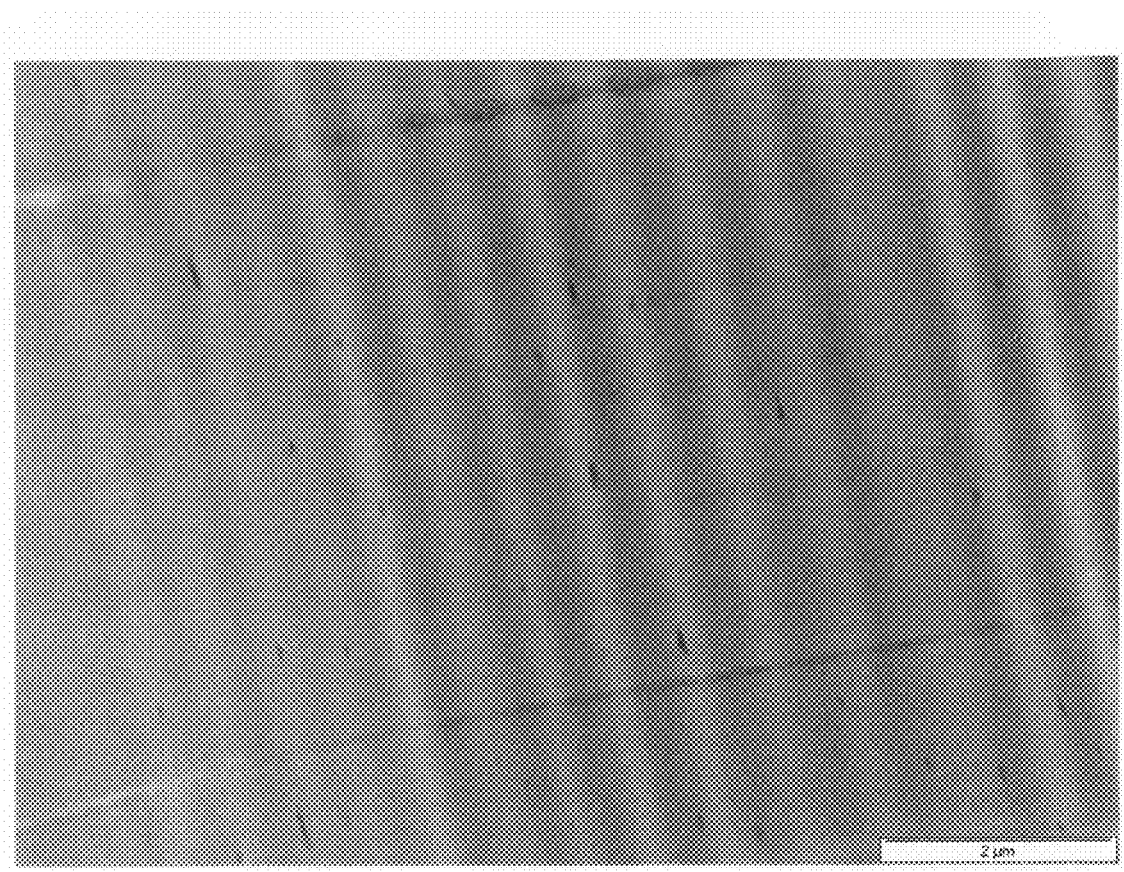
FIGS. 4a to 4c are TEM images of rigid PVC without added nanoclay (FIG. 4a) and with added nanoclay (FIGS. 4b and 4c), which images illustrate the effect on nanoclay aggregation based on the addition sequence of the nanoclay to the PVC.
Figure 4B:
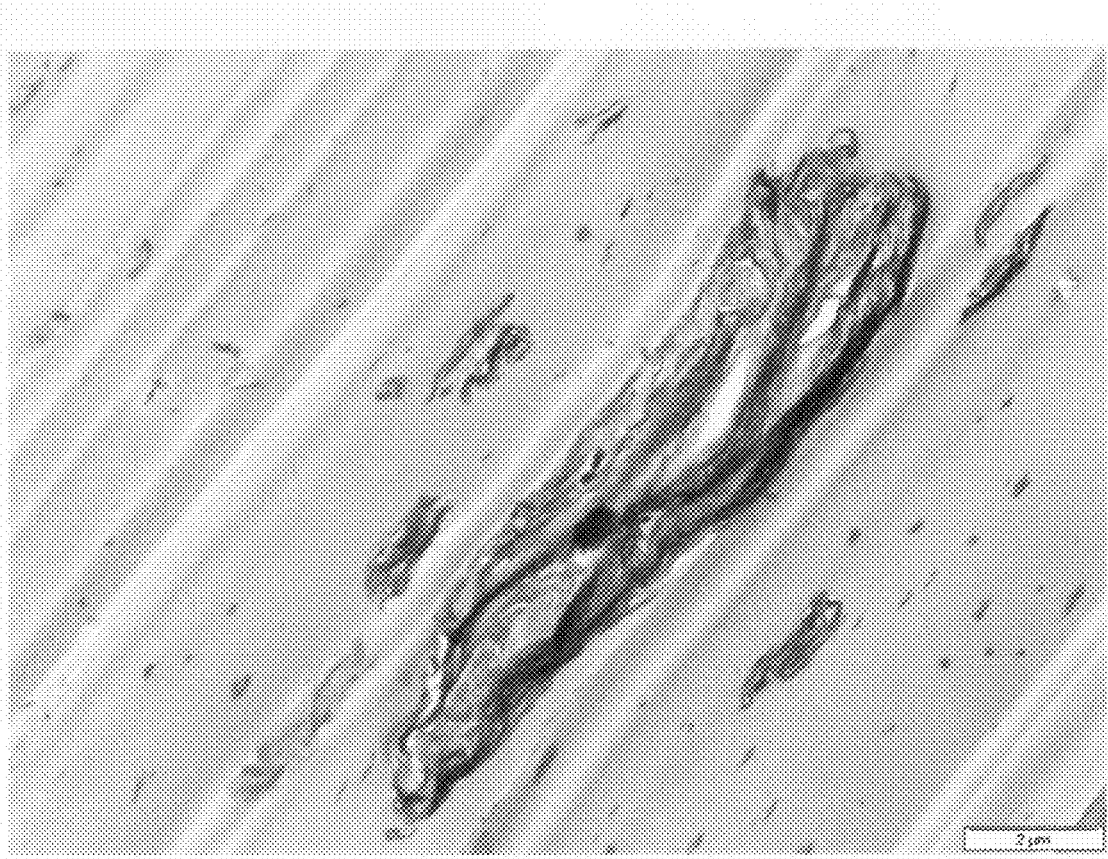
Figure 4C:
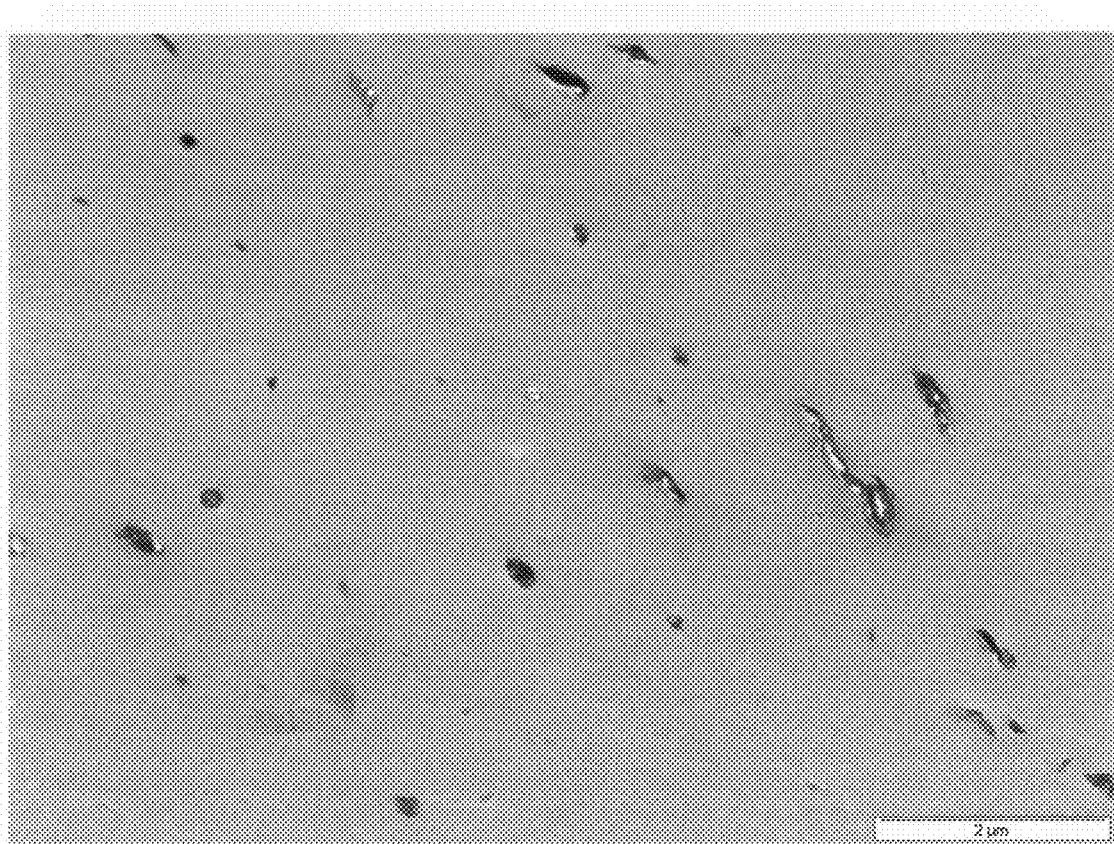

Conventional TEM photographs shown in FIGS. 4a-4c illustrate the above-d discussed dispersion of nanoparticles in the matrix. Some nanoclay aggregates are clearly seen in the matrix when directly mixed with the matrix (FIG. 4b). The result implies that nanoclay has been only partially exfoliated and not well dispersed. By contrast, a lower degree of aggregation is observed in the samples when nanoclay was incorporated in the matrix at the fusion onset point (FIG. 4c). Also, a much better dispersion is observed in FIG. 4c.

The addition method had a strong effect on both bending (Table 5) and tensile (Table 6) properties of PVC-nanoparticle composites. The data listed in these compression molded samples indicate that the addition of nanoclay to the PVC matrix is preferably performed at the onset of fusion or later when the PVC particles are reduced in size. In contrast, the poor properties observed when adding the nanoclay via direct mixing (6,7) can be attributed to the poor dispersion of nanoclay into the PVC polymer matrix (and a resulting WPC), because nanoclay layers tend to bond strongly together.

Mechanical Properties of Carbon Nanotube-Reinforced Rigid PVC

Figure 5A:
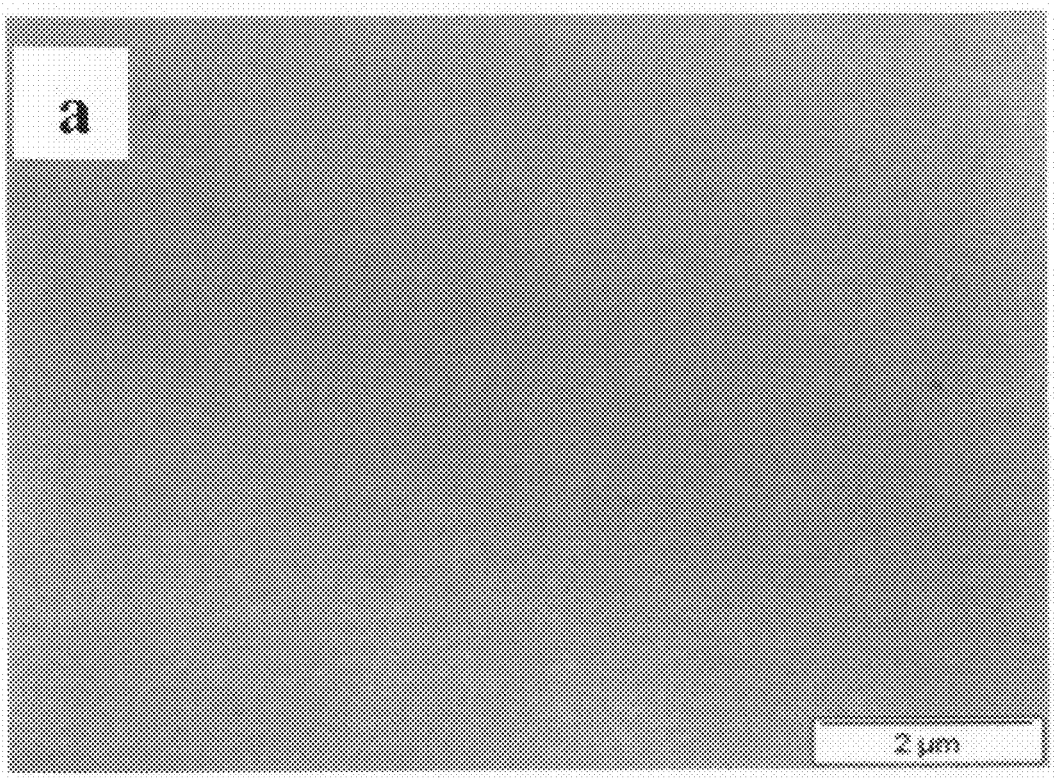
FIGS. 5a to 5d are TEM images of rigid PVC (FIG. 5a) and PVC/CNT composites (FIGS. 5b-5d), which images illustrate the effect on CNT loading on the homogeneity of the CNT dispersion in the PVC.
Figure 5B:
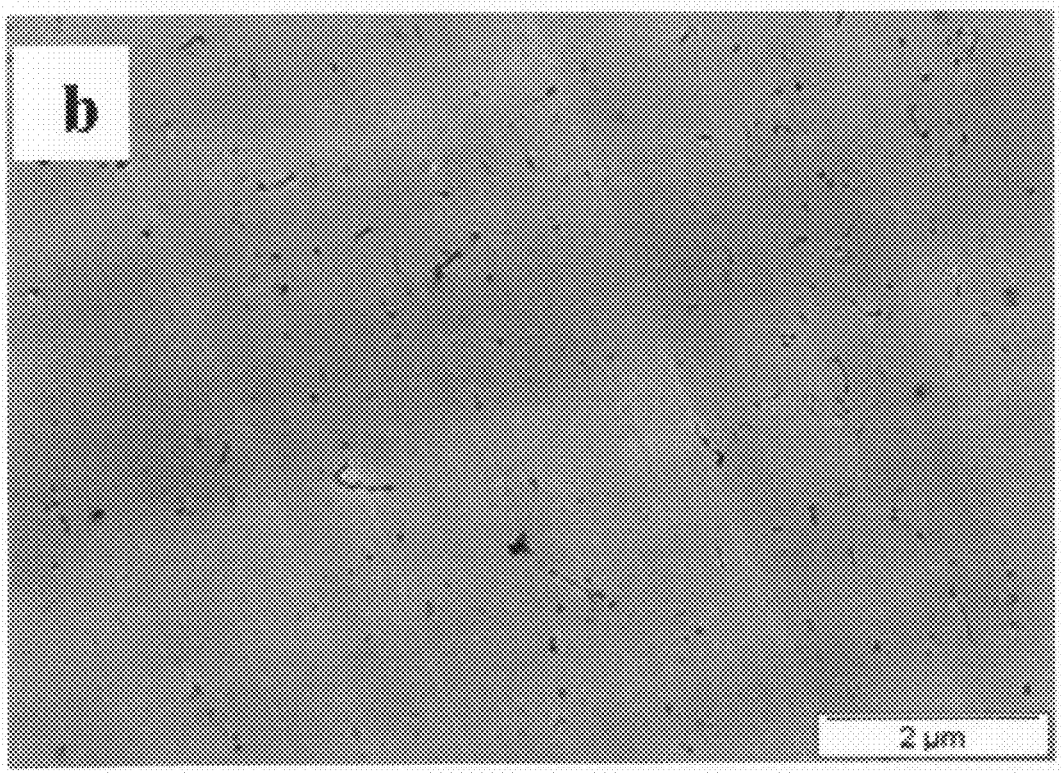
Figure 5C:
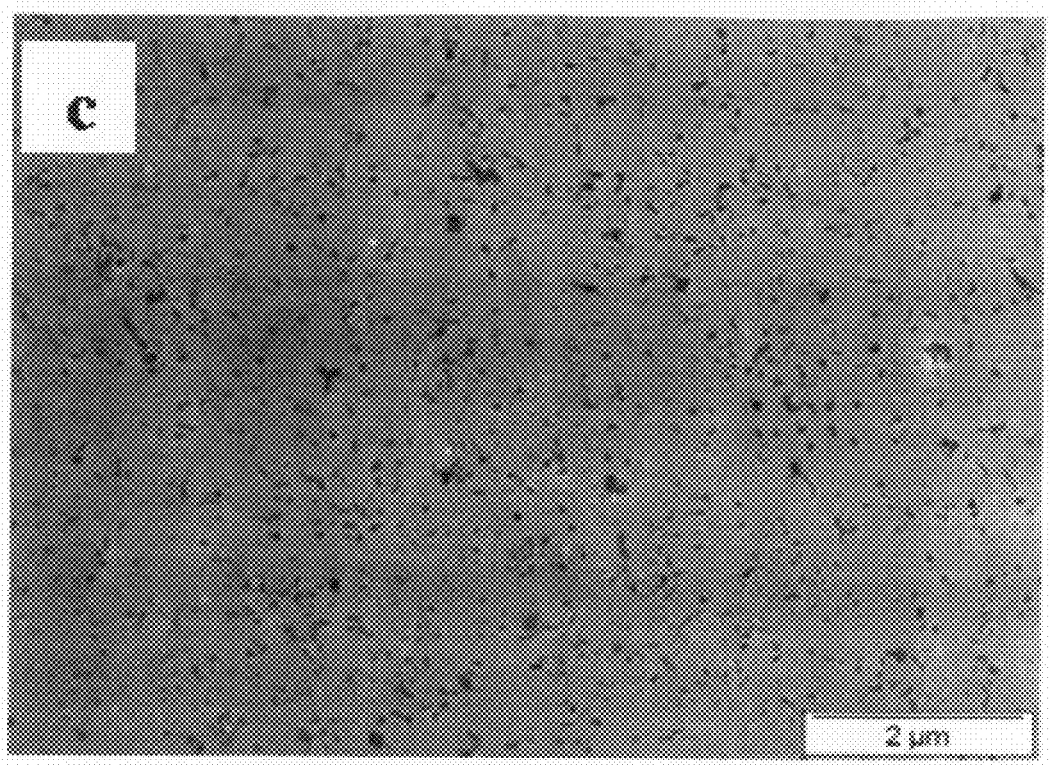
Figure 5D:
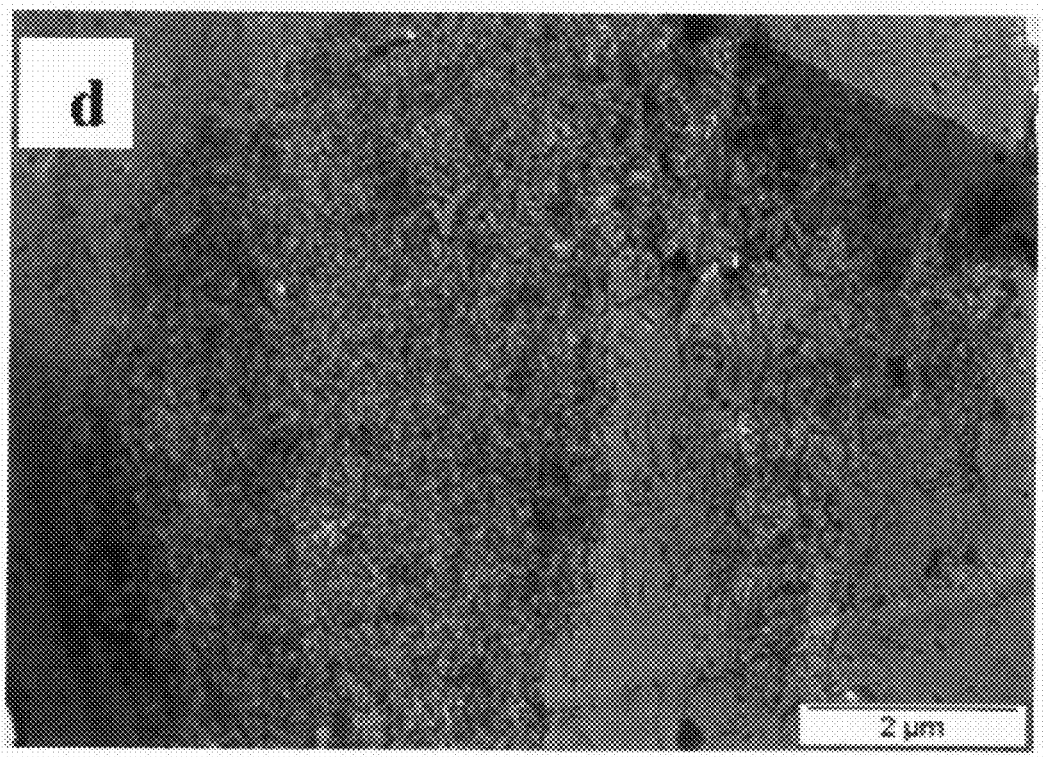

The dispersion of CNT in a PVC matrix as a function of CNT content was observed by TEM. FIGS. 5a-5d are TEM microphotographs of rigid PVC (FIG. 5a) and PVC/CNT composites with 1, 5 and 10 wt. % CNT (FIGS. 5b-5d, respectively). A homogeneous dispersion of CNT in rigid PVC was achieved at levels up to about 5 wt. %. At a concentration of 10 wt. % CNT, the nanotubes started to aggregate due to the presence of more primary nanotubes in the matrix, which led to a poor dispersion of CNT.

The effect of CNT addition levels on the flexural properties of rigid PVC/CNT composites is summarized in Table 7. The CNT were added into PVC at the onset of fusion. The flexural strength and modulus of the PVC/CNT composites were compared to those of PVC. The addition of CNT into the PVC matrix resulted in greater flexural strength and modulus than the PVC, irrespective of the amount of CNT. However, two distinct trends were observed. The flexural strength and modulus increased with CNT content up to 5 wt. % and

TABLE 5

Flexural Properties of Compression Molded PVC-Nanoparticle
Composites (CLOISITE Na+ and CLOISITE 30B)

| Point of Addition of Nanoclay into PVC Matrix | Flexural Strength (MPa) | | Flexural Modulus (GPa) | |
|---|---|---|---|---|
| | CLOISITE Na+ | CLOISITE 30B | CLOISITE Na+ | CLOISITE 30B |
| No nanoclay added (control) | 69.4 ± 1.1[A] | 69.4 ± 1.1[A] | 2.17 ± 0.05[A] | 2.17 ± 0.05[A] |
| Direct mixing | 70.9 ± 1.8[A] | 71.8 ± 1.9[AB] | 2.43 ± 0.08[B] | 2.76 ± 0.08[B] |
| At compaction (Point B) | 71.8 ± 1.2[A] | 74.9 ± 2.3[C] | 2.48 ± 0.07[B] | 2.92 ± 0.12[C] |
| Onset of fusion (Point X) | 86.4 ± 5.2[B] | 80.5 ± 2.6[D] | 3.13 ± 0.17[C] | 3.15 ± 0.12[D] |
| Equilibrium torque (Point E) | 68.9 ± 2.4[A] | 74.1 ± 1.8[BC] | 2.33 ± 0.13[B] | 2.87 ± 0.09[BC] |

TABLE 6

Tensile Properties of Compression Molded PVC-Nanoparticle
Composites (CLOISITE Na+)

| Point of Addition of Nanoclay into PVC Matrix | Tensile Property | | | |
|---|---|---|---|---|
| | Strength (MPa) | Modulus (GPa) | Elongation at Break (%) | Energy to Break (J) |
| No nanoclay added (control) | 39.8 ± 0.7[A] | 1.90 ± 0.03[A] | 5.3 ± 1.3[A] | 6.3 ± 2.0[A] |
| Direct mixing | 33.9 ± 2.4[B] | 2.06 ± 0.05[B] | 2.8 ± 0.4[B] | 2.5 ± 0.6[B] |
| At compaction (Point B) | 41.3 ± 3.5[A] | 2.24 ± 0.08[C] | 4.8 ± 2.7[AB] | 5.1 ± 3.8[AB] |
| Onset of fusion (Point X) | 46.6 ± 1.9[C] | 2.52 ± 0.05[D] | 4.0 ± 1.9[AB] | 4.6 ± 1.9[AB] |
| Equilibrium torque (Point E) | 42.3 ± 2.4[A] | 2.22 ± 0.09[C] | 3.4 ± 0.6[AB] | 3.7 ± 1.1[AB] | decreasing tendency was observed above 5 wt. % addition level. The greatest improvement in both flexural strength (47%) and modulus (70%) was achieved when 5 wt. % CNT was incorporated into the rigid PVC matrix. The increased flexural properties up to 5 wt. % CNT content may be due to a better dispersion of CNT in the matrix. By contrast, the decreasing tendency in flexural properties above 5 wt. % CNT may be explained by the agglomeration of primary nanotubes which led to poor dispersion of CNT, as shown in FIG. 5d.

TABLE 7

Flexural Properties of PVC/CNT Composites

| CNT Content in PVC | Flexural Properties | |
|---|---|---|
| | Strength (MPa) | Modulus (GPa) |
| 0 wt. % (control) | 69.4 ± 1.1$^A$ | 2.17 ± 0.05$^A$ |
| 1 wt. % | 88.8 ± 2.7$^B$ | 2.96 ± 0.10$^B$ |
| 3 wt. % | 94.2 ± 3.4$^C$ | 3.26 ± 0.14$^C$ |
| 5 wt. % | 102.0 ± 2.9$^D$ | 3.70 ± 0.16$^D$ |
| 7.5 wt. % | 89.1 ± 5.3$^B$ | 3.20 ± 0.20$^C$ |
| 10 wt. % | 85.6 ± 4.2$^B$ | 3.13 ± 0.17$^{BC}$ |

The tensile properties of the rigid PVC/CNT composites are summarized in Table 8. The CNT were added into PVC at the onset of fusion. The tensile strength and modulus showed a similar trend to that of the flexural strength and modulus. Rigid PVC/CNT composites showed a significant increase in tensile strength and modulus compared to PVC alone up to a CNT content of about 5 wt. %. Above these contents, the tensile strength and modulus began to decrease. The results imply that the maximum amount of CNT to enhance both the tensile and flexural properties of rigid PVC is around 5 wt. %. The improvement in tensile strength and modulus induced by the addition of CNT in PVC was achieved at the expense of both elongation at break and energy to break. As listed Table 8, the elongation at break and energy to break of rigid PVC were significantly reduced by adding CNT into the matrix. The extent of property reduction was a strong function of CNT content, i.e., the elongation at break and energy to break decreased linearly as the CNT content increased in the composite samples. The results indicate that CNT-reinforced PVC composites are more brittle than rigid PVC samples.

TABLE 8

Tensile Properties of PVC-CNT Composites

| CNT Content in PVC | Tensile Property | | | |
|---|---|---|---|---|
| | Strength (MPa) | Modulus (GPa) | Elongation at Break (%) | Energy to Break (J) |
| 0 wt. % (control) | 43.2 ± 1.4$^A$ | 1.95 ± 0.10$^A$ | 17.3 ± 14.5$^A$ | 21.3 ± 18.7$^A$ |
| 1 wt. % | 48.7 ± 2.4$^B$ | 2.13 ± 0.18$^B$ | 6.6 ± 2.2$^B$ | 8.9 ± 3.3$^B$ |
| 3 wt. % | 50.2 ± 3.3$^{BC}$ | 2.32 ± 0.18$^C$ | 5.1 ± 1.1$^C$ | 6.5 ± 2.0$^{BC}$ |
| 5 wt. % | 56.0 ± 2.2$^D$ | 2.71 ± 0.12$^D$ | 4.4 ± 0.2$^D$ | 5.8 ± 0.6$^C$ |
| 7.5 wt. % | 52.1 ± 1.9$^C$ | 2.57 ± 0.13$^{DE}$ | 4.1 ± 0.7$^D$ | 5.5 ± 1.6$^C$ |
| 10 wt. % | 46.0 ± 1.7$^E$ | 2.44 ± 0.11$^{CE}$ | 3.2 ± 0.3$^E$ | 3.3 ± 0.6$^D$ |

Example 2

Wood-Polymer Composites Including PVC-Nanoparticle Composites

Preparation of PVC-Nanoparticle Composite Matrix for Hybrid (WPC) Composites

PVC and other additives listed in Table 1 were dry-blended in a high intensity mixer for 10 minutes.

Nanoparticles (e.g., nanoclay, carbon nanotubes) were then mixed with the above described pre-blended PVC formulation in a 60-ml, electrically heated, three-piece internal mixer/measuring head (3:2 gear ratio) with roller-style mixing blades.

The strategy used to disperse the nanoparticles into the pre-blended PVC was as follows: The pre-blended PVC was placed into the mixer and the mixing process was started to follow the fusion curve. Nanoparticles were added into the mixer at the onset of the fusion, i.e., the point where the material reached a void-free state and starts to melt. At this point, the PVC primary particles are reduced from micron in size to submicroparticles (i.e., less than 1 μm in diameter, for example less than about 100 nm in diameter, or about approximately 10-30 nm in diameter) (13,14), allowing a much better dispersion of nanoclay to PVC matrix. After nanoparticle addition, the materials remained in the mixer until equilibrium torque was reached.

The mixing process was run at a constant mixer temperature of 150° C. for 5 minutes. The rotor speed used was 50 rpm and weight charge set at 65 g. A 5 kg dead weight was put on the top of the ram throughout the experiments (17). The ram is like a piston that pushes the sample inside the mixer. The mixer is available from C. W. Brabender Instruments, Inc. (South Hackensack, N.J.).

Various amounts of nanoparticles were used (e.g., nanoclay at 2.5, 5, and 7.5 wt. % and carbon nanotubes at 1, 3, 5, 7.5, and 10 wt. %, based on the total amount of PVC in the mixer). For comparison with the nanoparticle-reinforced PVC matrix, a pre-blended PVC without nanoparticles was also run in the mixer as a control matrix. This was accomplished to eliminate the thermal history effect between the two matrices (with and without nanoparticles).

At the end of the experiments, the compounded PVC-nanoparticle composite and rigid PVC without nanoclay (control) were granulated (Conair WORTEX JC 5) to produce composite pellets which were used as matrices in WPCs.

Manufacture of Hybrid (WPC) Composites

PVC/wood-flour composites were made using two (2) different matrices: (i) rigid PVC without nanoclay (control) and (ii) rigid PVC reinforced with various amounts of nanoclay particles. Each composite contained 40 wt. % wood flour based on the total weight of the composite. When used, the coupling agent (chitin) content was fixed at 6.67 wt. % (relative to the wood flour content), which is a preferred concentration for PVC/wood-flour composites as described in Matuana et al. U.S. Publication No. 2006/0293418, which is incorporated herein by reference in its entirety.

The matrix and dried wood flour (with or without chitin) were blended in a 60 ml electrically heated three-piece internal mixer/measuring head using previously mentioned mixing conditions. The melted composites were then compression molded into panels (Carver Laboratory Press, Fred S. Carver Inc., USA) at 180° C. for 2 minutes. The panel's thickness was around 3 mm.

Properties of Hybrid (WPC) Composites Using Nanoclay Nanoparticles

The effect of matrix types on the flexural properties of PVC/wood-flour composites is summarized in Table 9. The flexural strength and modulus of the compression molded composites were compared with a variation of nanoclay content (CLOISITE Na$^+$) in the matrix as well as the use of an adhesion promoter (i.e., inclusion of chitin as a coupling agent at 6.67 wt. %). In Table 9, the values in parentheses represent the standard deviations and the percent change is based on the properties of the composites made with the rigid PVC matrix without nanoclay (control).

TABLE 9

Flexural Properties of Nanoclay-Reinforced PVC/Wood-Flour Composites

| | Without Chitin | | | | With Chitin | | | |
|---|---|---|---|---|---|---|---|---|
| PVC Matrix | Strength (MPa) | % change | Modulus (GPa) | % change | Strength (MPa) | % change | Modulus (GPa) | % change |
| 0% nanoclay (control) | 56.8 (1.4) | — | 4.1 (0.8) | — | — | — | — | — |
| 2.5% nanoclay | 70.5 (2.0) | 24.2 | 5.8 (0.2) | 41.2 | 75.2 (2.2) | 32.4 | 6.2 (0.1) | 52.0 |
| 5% nanoclay | 83.9 (5.0) | 47.7 | 6.1 (0.4) | 47.6 | 87.4 (2.6) | 54.0 | 7.2 (0.7) | 75.6 |
| 7.5% nanoclay | 64.9 (3.1) | 14.3 | 4.7 (0.3) | 15.4 | 83.5 (4.0) | 47.1 | 6.7 (0.4) | 62.7 |

The use of a nanoclay-reinforced PVC matrix resulted in a greater flexural strength than the composites without nanoparticles in the matrix, irrespective of both the amount of nanoclay in the matrix and the use of coupling agent (chitin) in the composites.

Without chitin, the flexural strength increased with nanoclay content up to about 5 wt. % and a decreasing tendency was observed after this concentration. A 47.7% increase in flexural strength was obtained by using 5% nanoclay in the matrix. Further enhancements were achieved by adding chitin into the composites, regardless of the nanoclay content. The observed increase in flexural strength of the composites may be attributed to the improved interfacial adhesion between wood flour and PVC matrix as seen in Matuana et al. U.S. Publication No. 2006/0293418. The percent increase in flexural strength also seems to level off at about 5 wt. % when chitin was added in the composites.

The flexural modulus of the composites showed a similar trend as the flexural strength. The use of nanoclay-reinforced PVC as a matrix resulted in greater flexural modulus than the composites without nanoparticles in the matrix, irrespective of both the amount of nanoclay in the matrix and the use of coupling agent in the composites. The addition of coupling agent was also beneficial in further improving the stiffness of the composites due to enhanced adhesion.

The stiffness of the composites increased by 75% when 5 wt. % nanoclay-reinforced rigid PVC was used as matrix combined with chitin coupling agent. It appears from these results that a preferred amount of nanoclay is about around 5 wt. %. These results may suggest a better dispersion of nanoclay in the matrix up to 5 wt. % loading content. Above this concentration there are more primary nanoparticles in the matrix; therefore, there is an increased tendency to form large nanoclay stacks which lead to poor dispersion of nanoparticles and decreased mechanical properties. In addition, the degradation of the PVC matrix, which decreases its mechanical properties, has been linked with the increase of nanoclay content in PVC (9).

As illustrated in Table 10, both the flexural strength and modulus of composites made with 5% nanoclay reinforced PVC matrix combined with chitin compared favorably with those of various species of solid wood and commercially available WPCs. The modulis of rupture (MOR) and modulus of elasticity (MOE) values for the wood species were measured at 12% moisture content (18). The data for the commercial WPCs were taken from commercial literature. As a reference, the ASTM D-6662-01 standard requirements for polyolefin-based plastic lumber decking boards include a flexural strength of 6.9 MPa and a flexural modulus of 0.34 GPa.

TABLE 10

Flexural Properties of Rigid PVC/Wood-Flour Composites Compared with Various Solid Wood Species and Commercial WPCs

| | Flexural Properties | |
|---|---|---|
| Materials | Strength (MPa) | Modulus (GPa) |
| Western red cedar | 51.7 | 7.7 |
| Northern white cedar | 45 | 5.5 |
| Jack pine | 68 | 9.3 |
| Ponderosa pine | 65 | 8.9 |
| Northern red oak | 99 | 12.5 |
| Red maple | 92 | 11.3 |
| TREX WPC (50% PE, 50% wood; Trex Inc.) | 10.4 | 1.1 |
| GEODECK WPC (40% HDPE, 60% wood; Kadant Composites Inc.) | 19.2 | 2.5 |
| TIMBERTECH WPC (50% HDPE, 50% wood; Crane Plastics Inc.) | 18.6-22.8 | 2.84-3.24 |
| FIBERON WPC (50% HDPE/LDPE/PVC, 50% wood; Fiber Composites Inc.) | 19.4 | 3.87 |
| Rigid PVC/wood-flour composites (5% nanoclay (CLOISITE Na$^+$) and 6.67% chitin) | 87.4 | 7.2 |
| Rigid PVC/wood-flour composites (5% carbon nanotubes and 6.67% chitin) | 97.8 | 7.6 |

On the basis of the optimum observed flexural properties discussed in the previous Examples, nanoclay content was fixed at 5 wt. % for further tensile and DMA experiments.

Figure 6:
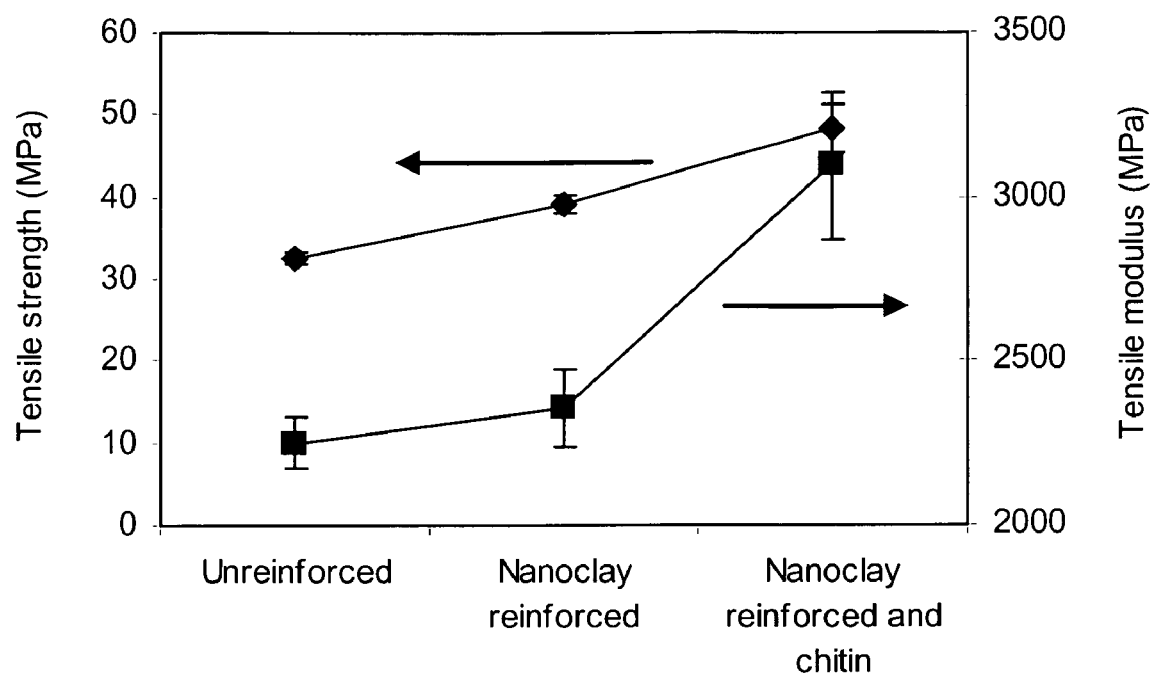
FIG. 6 is a graph showing effects of matrix type and coupling agent on the tensile properties of a PVC-nanoparticle-wood reinforcement composite.

Tensile properties of the composites are shown in FIG. 6, which illustrates the effects of matrix type and coupling agent on the tensile properties of rigid PVC/wood-flour composites. The compression molded composites contained 40 wt. % wood flour (all three cases), 5 wt. % nanoclay (when present) and 6.67 wt. % chitin (when present). Greater improvement was achieved in the composites made with the nanoclay-reinforced PVC matrix. Further improvements were observed in both tensile strength and modulus by adding chitin to the composites.

The dynamic mechanical properties (storage modulus, loss modulus and tan δ) of the three composites illustrated in FIG. 6 are summarized in Table 11. Composites prepared with nanoclay reinforced matrix showed greater increase in both elastic (85% in storage modulus) and viscous (225% in loss modulus) properties compared to composites made with an unreinforced matrix. The addition of chitin lead to further improvements in both elastic (350% in storage modulus) and viscous (1300% in loss modulus) properties of the composites made with nanoclay-reinforced matrix. Increased storage modulus (E') due to the addition of nanoclay into PVC matrix implies an increase in the load-bearing capacity of the composites. This trend correlates well with the flexural test data.

TABLE 11

Effects of Matrix Type and Coupling agent on the Dynamic Mechanical Properties of Hybrid WPCs (CLOISITE Na+)

| Samples | Tan δ Peak Max (° C.) | Storage Modulus E' (GPa) | | | Loss Modulus E" (GPa) | | |
|---|---|---|---|---|---|---|---|
| | | 40° C. | 50° C. | 60° C. | 40° C. | 50° C. | 60° C. |
| PVC-Wood | 86.9 ± 1.7 | 14.6 ± 4.6 | 12.8 ± 2.8 | 11.2 ± 2.5 | 1.9 ± 0.7 | 2.2 ± 0.5 | 2.6 ± 0.1 |
| PVC-Wood-Nanoclay | 86.9 ± 0.3 | 26.9 ± 2.2 | 18.8 ± 2.1 | 13.6 ± 2.1 | 6.2 ± 0.6 | 4.1 ± 0.2 | 3.0 ± 0.2 |
| PVC-Wood-Nanoclay-Chitin | 88.2 ± 1.3 | 65.6 ± 26.5 | 43.9 ± 9.2 | 30.4 ± 4.9 | 26.5 ± 5.4 | 20.6 ± 5.3 | 13.4 ± 2.9 |

The increased dynamic properties may be attributed to the reduced mobility of PVC chains due to both the polymer chains intercalated between nanoclay interlayers (9) and the increased adhesion between the wood flour and the matrix. These two (2) actions may restrict the free motion of PVC chains, leading to viscous blends and a corresponding increase in loss modulus.

Nanoclay reinforced PVC matrix and chitin had no significant effect on the glass transition temperature (tan δ peak max) of the composites. A similar trend was reported by other investigators (19).

Properties of Hybrid (WPC) Composites Using Carbon Nanotube Nanoparticles

As identified above, the maximum observed enhancement in tensile and flexural properties of CNT-reinforced PVC was achieved when 5 wt. % CNT was added to the matrix. Accordingly, PVC reinforced with 5 wt. % CNT was used as a matrix for the manufacture of WPCs (40 wt. % wood flour). The effect of matrix types on the flexural properties of PVC/wood-flour composites is listed in Table 12. The composites made with CNT reinforced PVC matrix and 40 wt. % wood flour resulted in greater flexural strength and modulus than their counter part made with unreinforced PVC matrix, irrespective of the use of chitin as coupling agent. However, further enhancements in flexural properties were achieved by adding chitin into the composites.

TABLE 12

Flexural Properties of PVC/CNT Hybrid Composites

| PVC-Based Composite | Flexural Properties | |
|---|---|---|
| | Strength (MPa) | Modulus (GPa) |
| PVC (40% wood flour) | 51.3 ± 4.9$^A$ | 3.95 ± 0.38$^A$ |
| PVC (40% wood flour, 5% CNT) | 90.5 ± 4.9$^B$ | 6.38 ± 0.38$^B$ |
| PVC (40% wood flour, 5% CNT; 6.67% chitin) | 97.8 ± 8.5$^B$ | 7.60 ± 0.60$^C$ |

The bending properties of WPCs manufactured in this study were better than those of commercial WPCs but similar to those of solid wood (Table 10). Nevertheless, the bending strength and modulus of WPCs made with CNT reinforced PVC were similar to their counterparts made with nanoclay (Table 10).

As mentioned, CNT can enhance the thermal conductivity and also electrical conductivity of polymers, which is favorable for electronic materials. However, the increased thermal and electrical properties induced by CNT are not desirable in WPCs since they are mainly used as building materials. Accordingly, both the electrical and thermal conductivity of various composites were measured to evaluate the effect of CNT on the ability of WPC to conduct heat and electrical current (Table 13). Generally, a material with electrical conductivity lower than $10^{-6}$ S/cm is classified as electrical insulator. The data in Table 13 clearly indicate that both rigid PVC reinforced with CNT and WPCs made with CNT-reinforced PVC samples were electrical insulators. These results are not in agreement with those reported in the literature indicating increased electrical conductivity for polymers when reinforced with CNT (12). However, other investigators have reported distinct trends: CNT-reinforced PVC exhibits either electrically conductive or insulator properties depending on the types, contents, structure, and dispersion of CNT into the matrix (12). The thermal conductivity of CNT-reinforced PVC and PVC/wood-flour composites slightly increased compared to their counter parts without CNT.

TABLE 13

Electrical and Thermal Conductivity Properties of PVC/CNT Hybrid Composites

| PVC-Based Composite | Conductivity Properties | |
|---|---|---|
| | Electrical (S/cm) | Thermal (W/m · K) |
| Rigid PVC (control) | $1.24 \times 10^{-16}$ | 0.163 ± 0.002 |
| PVC (5% CNT) | $2.56 \times 10^{-16}$ | 0.206 ± 0.012 |
| PVC (40% wood flour) | $1.03 \times 10^{-16}$ | 0.206 ± 0.003 |
| PVC (40% wood flour, 5% CNT) | $6.35 \times 10^{-16}$ | 0.229 ± 0.005 |
| Solid softwood lumbers | $10^{-14}$-$10^{-16}$ | 0.1-1.4 |

Example 3

Extruded PVC/Nanoparticle Composites

PVC (along with its additives) and nanoclay (CLOISITE Na+) were combined as previously described in Example 1. However, unlike the previous example in which the blended materials were hot-pressed (i.e., compression molded) after mixing, the samples obtained in the present example were directly extruded to profile or film to produce testing specimens. Specifically, the compounded materials were fed into a 32 mm conical counter-rotating twin-screw extruder (C. W. Brabender Instruments Inc.) with a length to diameter ration of 3:1. The barrel temperatures for processing from zone 1 (hopper) to zone 4 (horizontal die) were 180° C./180° C./180°

C./180° C. and the rotational speed of screws was maintained at 50 rpm throughout the processing.

The nanoclay addition sequence during compounding had a strong effect on both blending (Table 14) and tensile (Table 15) properties of nanoclay/PVC composites manufactured through an extrusion process. As in the case of compression molded samples, the data listed in these tables indicate that the nanoclay is preferably added to the PVC at the onset of fusion or later when PVC particles are reduced in size.

TABLE 14

Flexural Properties of Extruded PVC/Nanoclay Composites (CLOISITE Na+)

| Point of Addition of Nanoclay into PVC Matrix | Flexural Properties | |
|---|---|---|
| | Strength (MPa) | Modulus (GPa) |
| No nanoclay added (control) | 61.7 ± 4.8 | 1.94 ± 0.23 |
| Direct mixing | 56.6 ± 8.6 | 1.70 ± 0.31 |
| At compaction (Point B) | 53.6 ± 6.0 | 1.35 ± 0.26 |
| Onset of fusion (Point X) | 81.2 ± 3.8 | 2.74 ± 0.17 |
| Equilibrium torque (Point E) | 57.5 ± 3.4 | 1.76 ± 0.22 |

TABLE 15

Tensile Properties of Extruded PVC/Nanoclay Composites (CLOISITE Na+)

| Point of Addition of Nanoclay into PVC Matrix | Tensile Property | | | |
|---|---|---|---|---|
| | Strength (MPa) | Modulus (GPa) | Elongation at Break (%) | Energy to Break (J) |
| No nanoclay added (control) | 28.7 ± 2.4 | 1.42 ± 0.10 | 9.8 ± 1.9 | 13.2 ± 4.7 |
| Direct mixing | 25.9 ± 1.7 | 1.37 ± 0.07 | 6.3 ± 1.9 | 7.9 ± 3.5 |
| At compaction (Point B) | 22.1 ± 3.1 | 1.26 ± 0.12 | 4.7 ± 1.9 | 4.2 ± 2.2 |
| Onset of fusion (Point X) | 42.1 ± 1.6 | 2.23 ± 0.08 | 12.0 ± 7.3 | 18.0 ± 11.1 |
| Equilibrium torque (Point E) | 34.3 ± 1.2 | 1.49 ± 0.15 | 10.6 ± 3.4 | 16.0 ± 6.2 |

Similar conclusions can be drawn from the extruded experimental data when compared to that of the compression molded samples. Specifically, both the extent of property improvement and dispersion of nanoparticles in PVC-nanoparticle composites are strongly influenced by the degree of gelation achieved in PVC compounds during processing. Additionally, the mechanical properties of rigid PVC are significantly improved when nanoclay is introduced into the matrix at the onset of fusion or later.

Summary of Findings

The following conclusions can be drawn from the experimental results:

A novel method of dispersing nanoparticles in PVC to enhance its mechanical and visco-elastic properties has been developed.

Both the extent of property improvement and dispersion of nanoparticles in PVC-nanoparticle composites were strongly influenced by the degree of gelation achieved in PVC compounds during processing.

The mechanical and visco-elastic properties of rigid PVC were significantly improved when nanoclay or CNT is introduced into the matrix at the onset of fusion or later.

The use of nanoclay- or CNT-reinforced PVC as a matrix has resulted in composites with greater flexural, tensile and dynamic mechanical properties than the composites without nanoparticles in the matrix.

Further improvements were achieved when chitin was used as the coupling agent in the composites made with a nanoclay- or CNT-reinforced matrix. The stiffness of the composites increased by 75% when 5% nanoclay reinforced rigid PVC was used as matrix combined with chitin coupling agent.

The best performance in terms of mechanical properties was obtained when the matrix used in the composites was reinforced with 5 wt. % nanoclay or 5 wt. % CNT combined with 6.67 wt. % chitin.

Both the flexural strength and modulus of composites reinforced with 5 wt. % nanoclay or 5 wt. % CNT combined with 6.67 wt. % chitin compared favorably with or exceeded those of various species of solid wood. The results imply that wood-plastic composites with properties similar to or better than those of various solid wood lumbers can be achieved by using nanoclay- or CNT-reinforced PVC as a matrix.

All patents, patent applications, government publications, government regulations, and literature references cited in this specification are hereby incorporated herein by reference in their entirety. In case of conflict, the present description, including definitions, will control.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Combinations of components are contemplated to include homogeneous and/or heterogeneous mixtures, as would be understood by a person of ordinary skill in the art in view of the foregoing disclosure.

REFERENCES

1. L. M. Matuana and P. A. Heiden, "Wood Composites," in Encyclopedia of Polymer Science and Technology, Jacqueline I. Kroschwitz, Editor, John Wiley & Sons, Inc., (2004).
2. C. Clemons, *For. Prod. J.,* 52, 10 (2002).

3. J. M. Pilarski and L. M. Matuana, *J. Vinyl Additive Technol.,* 11, 1 (2005).
4. S. C. Jana and A. Prieto, *J. Appl. Polym. Sci.,* 86, 2159 (2002).
5. S. C. Jana and A. Prieto, *J. Appl. Polym. Sci.,* 86, 2168 (2002).
6. S. K. Yeh, A. Al-Mulla, and R. K. Gupta, *SPE ANTEC Technical Papers,* 1290 (2005).
7. S. K. Yeh, M. E. Casuccio, and A. Al-Mulla, *SPE ANTEC Technical Papers,* 209 (2006).
8. D. Wang and C. A Wilkie, *J. Vinyl Additive & Technol.,* 8, 238 (2002).
9. T. Ren, J. Yang, Y. Huang, J. Ren, and Y. Liu, *Polymer Compos.,* 27, 55 (2006).
10. D. Wang, D. Parlow, Q. Yao, and C. A Wilkie, *J. Vinyl Additive & Technol.,* 8, 139 (2002).
11. C. Xiong, S. Lu, D. Wang, L. Dong, D. D. Jiang, Q. Wang, *Nanotechnology,* 16, 1787 (2005).
12. J. H. Du, J. Bai and H. M. Cheng, *Express Polym. Lett.,* 1 (5), 253 (2007).
13. E. T. Thostenson, Z. Ren and T. Chou, *Compos. Sci. Technol.,* 61, 1899 (2001).
14. E. B. Rabinovitch and J. W. Summers, *J. Vinyl Additive & Technol.,* 2, 165 (1980).
15. E. B. Rabinovitch, *J Vinyl Additive & Technol.,* 4, 62 (1982).
16. Pegoretti A, Dorigato A, Penati A, Tensile mechanical response of polyethylene-clay nanocomposites, *eXPRESS Poly. Lett.* 2007; 1 (3): 123-131 (2007).
17. L. M. Matuana and J. W. Kim, *J Vinyl Additive & Technol.*, in press (March 2007).
18. Anonymous, "Wood Handbook: Wood as an Engineering Material," Forest Products Laboratory General Technical Report (FPL-GTR-113), USDA Forest Service, (1999).
19. B. L. Shah, L. M. Matuana, *J Vinyl Additive Tech.;* 11 (4): 160-165 (2005).

What is claimed is:

1. A method for forming a polyvinyl chloride-nanoparticle composite, the method comprising steps:
   (a) heating particles of a polyvinyl chloride (PVC) polymer to a temperature at or above a fusion point of the PVC, thereby fusing the PVC particles to form fused PVC particles having a size less than 100 nm;
   (b) blending a filler comprising nanoparticles into the fused PVC particles; and,
   (c) heating and mixing the blend of the fused PVC particles and the filler until the fused PVC particles are eliminated, thereby forming the polyvinyl chloride-nanoparticle composite, the composite comprising (i) a matrix comprising the PVC polymer and (ii) the filler dispersed throughout the matrix.

2. The method of claim 1, wherein the nanoparticles are selected from the group consisting of nanoclays, carbon nanotubes, titanium dioxide, calcium carbonate, ferromagnetic nanoparticles, and combinations thereof.

3. The method of claim 1, wherein the nanoparticles comprise a nanoclay intercalated by at least a portion of the PVC in the polyvinyl chloride-nanoparticle composite.

4. The method of claim 3, wherein the nanoclay is present in an amount ranging from about 4 wt. % to about 10 wt. % relative to the PVC.

5. The method of claim 3, wherein the nanoclay is selected from the group consisting of bentonite, montmorillonite, hectorite, fluorohectorite, saponite, beidellite, nontronite, and combinations thereof.

6. The method of claim 3, wherein the nanoclay has a relative intercalation of at least about 15% in the polyvinyl chloride-nanoparticle composite.

7. The method of claim 1, wherein the nanoparticles comprise carbon nanotubes.

8. The method of claim 1, wherein step (a) further comprises compacting the PVC particles.

9. The method of claim 1, further comprising a step:
   (d) blending a cellulosic reinforcement with the polyvinyl chloride-nanoparticle composite, thereby forming a wood-polymer composite.

10. The method of claim 9, wherein the cellulosic reinforcement comprises a wood flour selected from the group consisting of cedar, pine, maple, oak, spruce, and combinations thereof.

11. The method of claim 9, wherein step (d) further comprises blending a coupling agent with the polyvinyl chloride-nanoparticle composite, the coupling agent being selected from the group consisting of chitin, chitosan, and combinations thereof.

12. The method of claim 9, wherein step (d) further comprises extruding or compression molding the blend of the cellulosic reinforcement and the polyvinyl chloride-nanoparticle composite to form the wood-polymer composite.

13. The method of claim 9, further comprising a step:
   (e) forming the wood-polymer composite into a precut lumber shape.

14. The method of claim 1, wherein the fused PVC particles formed in step (a) have a diameter between 10 nm and 30 nm.

15. The method of claim 1, wherein step (a) further comprises
   (a-1) providing a composition comprising the particles of the PVC polymer and optionally one or more additives selected from the group consisting of heat stabilizers, lubricating processing aids, and combinations thereof; and
   (a-2) heating the composition to the temperature at or above the fusion point of the PVC, thereby fusing the PVC particles to form the fused PVC particles.

16. The method of claim 15, wherein the composition consists essentially of the particles of the PVC polymer and optionally the one or more additives.

17. The method of claim 15, wherein the composition consists of the particles of the PVC polymer and optionally the one or more additives.

18. The method of claim 1, comprising performing steps (a)-(c) in the absence of an organic solvent.

* * * * *

UNITED STATES PATENT AND TRADEMARK OFFICE
CERTIFICATE OF CORRECTION

PATENT NO.        : 7,897,681 B2                          Page 1 of 1
APPLICATION NO.   : 12/148236
DATED             : March 1, 2011
INVENTOR(S)       : Laurent M. Matuana It is certified that error appears in the above-identified patent and that said Letters Patent is hereby corrected as shown below:

Column 8, line 43, "do" should be --$d_o$--.

Column 12, line 16, "an a" should be --an $\alpha$--.

Column 15, line 16, "above-d discussed" should be --above-discussed--.

Column 22, line 65, "ration" should be --ratio--.

Column 22, line 66, "3:1" should be --13:1--.

Signed and Sealed this
Twenty-seventh Day of September, 2011

David J. Kappos
*Director of the United States Patent and Trademark Office*